United States Patent [19]
Hohmann et al.

[11] 3,920,632
[45] Nov. 18, 1975

[54] ANTHRAQUINONE DYESTUFFS

[75] Inventors: Walter Hohmann, Leverkusen; Helmut Herzog, Bergisch-Neukirchen; Hans-Samuel Bien, Burscheid, all of Germany

[73] Assignee: Bayer Aktiengesellschaft, Leverkusen-Bayerwerk, Germany

[22] Filed: Jan. 3, 1973

[21] Appl. No.: 320,721

[30] Foreign Application Priority Data
Jan. 3, 1972 Germany............................ 2200107

[52] U.S. Cl..................... 260/239.3 T; 8/39; 8/40; 260/247.1 A; 260/249; 260/256.5 R; 260/262; 260/272; 260/303; 260/307.5; 260/309.6; 260/326 D; 260/371; 260/372; 260/374; 260/376; 260/377; 260/378; 260/379; 260/381
[51] Int. Cl.$^2$........................................... C09B 1/34
[58] Field of Search..... 260/371, 372, 374, 239.3 T, 260/326 D

[56] References Cited
UNITED STATES PATENTS

| | | | |
|---|---|---|---|
| 2,001,044 | 2/1933 | Weinand et al..................... | 260/372 |
| 2,337,566 | 12/1943 | McNally et al. .................... | 260/371 |
| 2,563,144 | 8/1951 | Wilder................................ | 260/373 |
| 2,596,820 | 5/1952 | Ogilvie.............................. | 260/374 |
| 2,685,590 | 8/1954 | Weinand et al..................... | 260/372 |
| 3,154,567 | 10/1964 | Eisele et al. ....................... | 260/374 |

FOREIGN PATENTS OR APPLICATIONS

| | | | |
|---|---|---|---|
| 532,954 | 2/1941 | United Kingdom................. | 260/371 |
| 1,546,177 | 11/1968 | France............................... | 260/372 |

*Primary Examiner*—Robert Gerstl
*Assistant Examiner*—E. Jane Skelly
*Attorney, Agent, or Firm*—Plumley & Tyner

[57] ABSTRACT

Anthraquinone dyestuffs which in the acid form correspond to the formula

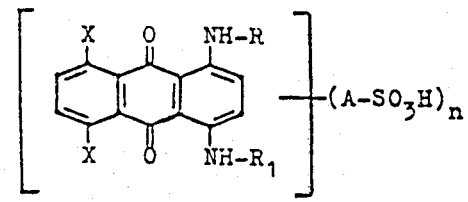

wherein R, R$_1$, the two X, A and n have the meaning given in the description. The new dyestuffs are valuable products which are outstandingly suitable for dyeing and printing natural and synthetic polyamide materials such as wool, silk, polyamide and the like, on which, in part, brilliant dyeings with good to very good fastness properties are obtained.

1 Claim, No Drawings

ANTHRAQUINONE DYESTUFFS

The subject of the present invention are anthraquinone dyestuffs which in the acid form correspond to the formula

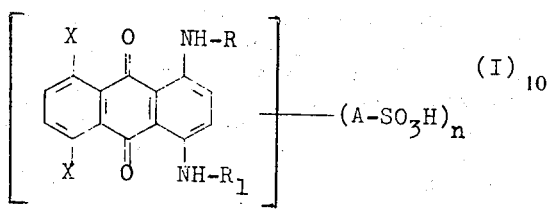

wherein
R and $R_1$ = alkyl, cycloalkyl, aralkyl, aryl or a heterocyclic radical, with R and $R_1$ not being permitted to have the same meaning simultaneously,
one X = nitro or optionally substituted amino, the other X = hydrogen,
A = a direct bond or —O—, with the radical —O-$SO_3H$ being bonded to a C atom of the radicals R, $R_1$ or X and the radical —$SO_3H$ being bonded to a C atom of an aromaticcarbocyclic ring in X, R or $R_1$ or to a C atom of the anthraquinone nucleus and
n denotes 1 – 4,
as well as processes for their manufacture and their use for dyeing and printing natural and synthetic fibre materials.

Preferred dyestuffs are those which in the acid form correspond to the formula

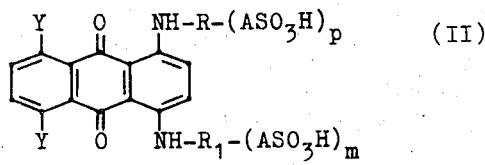

in which
R, $R_1$ and A have the meaning indicated in the formula (I),
one Y represents an acylamino radical,
the other Y represents hydrogen and
p and m denote the numbers 0 – 3, with p + m = 1 – 4 and —R—$(ASO_3H)_p$ and —$R_1$—$(ASO_3H)_m$ not having the same meaning simultaneously.

Further preferred dyestuffs are those which in the acid form correspond to the formula

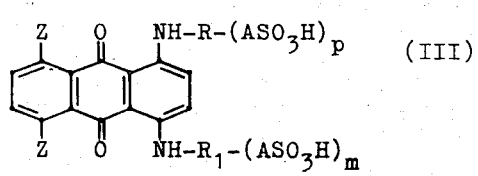

in which
R, $R_1$, A, p and m have the meaning indicated in the formula (II),
one Z represents an optionally substituted amino group and
the other Z represents hydrogen.

Further preferred dyestuffs are those which in the acid form correspond to the formula

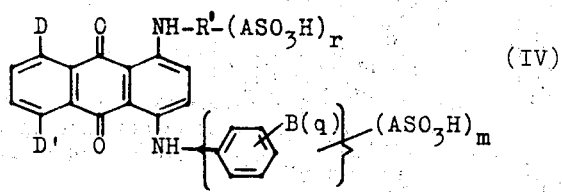

in which
R' represents an alkyl, cycloalkyl or aralkyl radical,
D and D' represent a nitro group or hydrogen, but cannot simultaneously have the same meaning,
B represents a substituent,
A represents a direct bond or —O—, with the $SO_3H$ group being bonded to a C atom of an aromatic-carbocyclic ring if A is a direct bond,
q represents the numbers 0 – 4 and
r and m represent the numbers 0 – 3, with r + m = 1 – 4 and –R'–$(ASO_3H)_4$ and

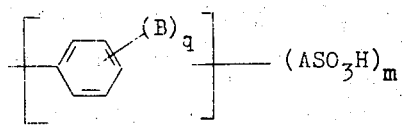

not having the same meaning.

Particularly preferred dyestuffs within this group are those in which R represents an optionally substituted secondary alkyl radical or a cyclohexyl radical.

Further preferred dyestuffs are those which in the acid form correspond to the formula

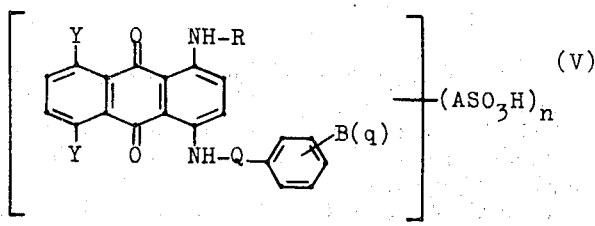

in which
R represents an alkyl, cycloalkyl, aralkyl, aryl or heterocyclic radical, with R and the radical

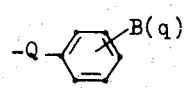

not being allowed to have the same meaning simultaneously,
one Y represents an acylamino radical, especially also a reactive acylamino radical,
the other Y represents hydrogen,
Q represents an optionally substituted $C_1$-$C_7$ alkylene radical or a direct bond, B represents a substituent, A represents a direct bond or —O—, with the radical —ASO$_3$H being bonded to a C atom of the radicals R, B and Y if A = —O—, and to a C atom of R, B, Y or the anthraquinone nucleus if A represents a direct bond and q represents the numbers 0 – 4 and n represents the numbers 1 – 4.

Within this group, those dyestuffs are preferred – especially in the case of the non-fibre-reactive acylamino radicals – in which R represents a secondary alkyl radical or a cyclohexyl radical.

Further preferred dyestuffs are those which in the acid form correspond to the formula

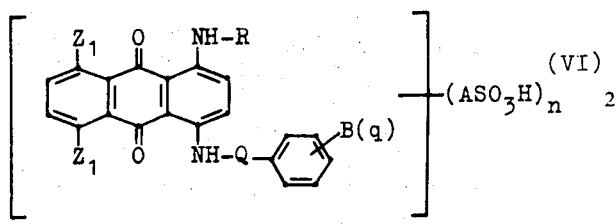

in which

R, Q, B, q, A and n have the meaning indicated in the formula (V),

B in particular can also denote a reactive acylamino radical, one $Z_1$ represents an amino, alkylamino, aralkylamino, cycloalkylamino or arylamino group, the other $Z_1$ represents hydrogen and the radical —OSO$_3$H is bonded to a C atom of the radicals R or B and the radical —SO$_3$H is bonded to a C atom of R, B or the anthraquinone nucleus, and R and

are not allowed to have the same meaning simultaneously.

Within this group, those dyestuffs in which R represents a secondary alkyl radical or a cyclohexyl radical are particularly preferred.

Suitable alkyl radicals R and $R_1$ are especially $C_1$-$C_{12}$-alkyl radicals such as methyl, ethyl, propyl, butyl, hexyl or dodecyl, which can optionally possess further substituents, for example nitrile, hydroxyl, nitro, halogen, alkoxy, alkoxycarbonyl, alkoxycarbonyloxy, alkylcarbonyloxy, acylamino especially alkylcarbonylamino, alkylsulphonyl, acylsulphonyl, alkylaminocarbonyloxy, acylaminocarbonyloxy, alkylaminocarbonylamino, acylaminocarbonylamino, alkylaminothiocarbonylamino, alkylaminosulphonyloxy, acylaminosulphonyloxy, aryloxy, amino, monoalkylamino and dialkylamino, arylcarbonyloxy and alkylmercapto.

The alkyl and alkoxy groups are at the same time preferably those with 1 -4 C atoms and the aryl groups are preferably optionally substituted phenyl groups.

Examples of such alkyl radicals are: β-chloroethyl, β,β,β-trifluoroethyl, β,ε-dichloropropyl, β-cyanoethyl, β-cyanoethoxyethyl, β-methoxyethyl, δ-methoxybutyl, glycidyl, β-hydroxyethyl, β,γ-dihydroxypropyl, β-nitroethyl, β-methoxycarbonylethyl, β-propoxycarbonylethyl, β-cyanoalkoxycarbonylethyl, β-methoxycarbonylpropyl, β-acetylaminoethyl, β-acetoxyethyl, β-propoxyethyl, β,γ-diacetoxypropyl, β-acetylaminopropyl, β-methylsulphonylethyl, β-ethylsulphonylethyl, γ-chlorophenylsulphonylpropyl, β-methylaminocarbonyloxyethyl, β-phenylaminocarbonyloxyethyl, β-methylaminocarbonylaminoethyl, β-methoxycarbonyloxyethyl, β-methylaminothiocarbonylaminoethyl, β-methylaminosulphonyloxyethyl, γ-phenylaminosulphonyloxypropyl, β-nitrophenoxyethyl, β-hydroxyphenoxyethyl, β-cyanoethoxycarbonylethyl, β-carboxyethyl, β-acetylaminoethyl, γ-aminopropyl, β-diethylaminoethyl, β-benzoyloxyethyl and β-ethylsulphonylethyl. Suitable aryl radicals R and $R_1$ are especially optionally substituted phenyl and naphthyl radicals. As substituents there may be mentioned: the abovementioned $C_1$-$C_{12}$-alkyl radicals, Cl, Br, F, alkoxy, especially $C_1$-$C_4$-alkoxy which is optionally substituted further, optionally substituted phenyl, cyclohexyl, aryloxy, carboxyl, acylamino, especially alkylcarbonylamino, alkylthio, arylthio, alkylsulphonyl, arylsulphonyl, amino, alkylsulphonyloxy, arylsulphonyloxy, alkoxysulphonyl, aryloxysulphonyl, alkoxycarbonyl, alkylaminosulphonyl, aralkylaminosulphonyl, dialkylaminosulphonyl, phthalimidomethylene, caprolactam-(N)-methylene, alkylcarbonylaminomethylene, arylcarbonylaminomethylene, alkylamino-, dialkylamino-, cycloalkylamino- and aralkylamino-carbonylamino. Alkyl and alkoxy are at the same time preferably radicals with 1 – 4 C atoms and aryl is in particular optionally substituted phenyl.

The following radicals may be mentioned as examples: phenyl, naphthyl, methyl-, 2,6-dimethyl-, 2,4,6-trimethyl-, ethyl-, 4-tert.-butyl-, 4-dodecyl-, 2-methyl-6-ethyl, 2,4-dimethyl-6-ethyl-, chloro-, bromo-, fluoro-, cyano-, methoxy-, ethoxy-, β-hydroxyethoxy-, β-cyanoethoxy-, 3-chloro-4-methoxy-, 2-methyl-4-methoxy-, 2,5-diethoxy-, 4-methylaminomethyl-, 4-phenyl-, 4-cyclohexyl-, 2,5-dimethoxy-, 2-, 3- or 4-dimethylaminomethyl-, 4-phenoxy-, 4-methylthio-, 4-phenylthio-, 3-(β-hydroxyethylsulphonyl)-, 3-phenylsulphonyl-, 2-, 3- or 4-amino-, acetylamino-, N-methylacetylamino-, N-cyclohexylacetylamino-, hydroxyacetylamino-, methoxyacetylamino-, phenylsulphonyloxy-, methylsulphonyloxy-, phenoxysulphonyl-, ethoxysulphonyl-, carboxy-4-acetylamino-2-carboxy-, methoxycarbonyl-, acetyl-, phenylcarbonyl-, diethylaminosulphonyl-, N-(β-hydroxyethyl)-N-(β-cyanoethyl)-aminosulphonyl-, N,N-di-(β-cyanoethylamino)-sulphonyl-, β-phenylethylaminosulphonyl-, β-hydroxyethoxyethoxy-, γ-hydroxypropoxy-, β-hydroxyethylmercapto-, N-(β-hydroxyethylamino)-carbonyl-, and β,γ-dihydroxypropoxy-phenyl, and also methoxy-, cyclohexyloxy-, benzyloxy- and phenoxy-carbonylaminophenyl as well as phenyl radicals which are substituted by one or more phthalimido-N-methylene, caprolactamN-methylene, propionylaminomethylene, succinimidomethylene, benzoylaminomethylene, carbamoylaminomethylene or carbethoxyaminomethylene radicals.

Examples of suitable naphthyl radicals are 2-ethoxy-, 6-hydroxy-α-naphthyl and 3-hydroxy-β-naphthyl.

Suitable araliphatic radicals are especially phenyl$C_1$-$C_8$-alkyl radicals which are optionally substituted further, for example phenylmethyl, β-phenylethyl, γ-phenylpropyl, β-phenyl-α-methylethyl and γ-phenyl-α,γ,γ-trimethylpropyl.

Suitable cycloaliphatic radicals are cyclohexyl, cyclohexyl substituted by $C_1$-$C_8$-alkyl, benzyl-cyclohexyl optionally further substituted in the benzene radical, phenoxy-cyclohexyl, $C_1$-$C_4$-alkoxycyclohexyl, aminocyclohexyl, alkylamino-cyclohexyl and acylaminocyclohexyl.

Examples of suitable optionally substituted amino groups are amino, alkylamino, dialkylamino, aralkylamino, arylamino and acylamino, with alkyl preferably representing $C_1$-$C_4$-alkyl which can be substituted as indicated above and arylamino preferably representing optionally substituted phenylamino.

Suitable acylamino groups are especially $C_1$-$C_{12}$-alkylcarbonylamino groups and $C_1$-$C_4$-alkylsulphonylamino groups which can be substituted, for example, by chlorine, bromine, $C_1$-$C_4$alkoxy, hydroxyl, nitrile, amino and alkylamino, such as methyl-, ethyl-, dodecyl-, propenyl-, chloromethyl-, dichloromethyl-, β-chloroethyl-, γ-chloropropyl and β-cyanoethylcarbonylamino, also cyclohexylcarbonylamino and methyl-cyclohexylcarbonylamino and phenylcarbonylamino or phenylsulphonylamino optionally substituted by the radicals mentioned above in connection with the aryl radicals R and $R_1$, for example phenyl-, $C_1$-$C_4$-alkoxyphenyl-, $C_1$-$C_4$-alkylphenyl-, halogenophenyl-, nitrophenyl-, hydroxyphenyl-, carboalkoxyphenyl-, dialkylaminophenyl- and alkylsulphonylphenyl-carbonylamino or -sulphonylamino; naphthylcarbonylamino, for example 6-methylnaphthylcarbonyl-1, $C_1$-$C_6$-alkoxycarbonylamino, aryloxycarbonylamino, cycloalkoxycarbonylamino, aminocarbonylamino such as $C_1$-$C_6$-alkylaminocarbonylamino and arylaminocarbonylamino, especially optionally substituted phenyl- and naphthyl-aminocarbonylamino; alkyl-, cycloalkyl-, aralkyl- and aryl-sulphonylamino.

A special group of acylamino groups are those with fibre-reactive groups, with the fibre-reactive acyl group being bonded directly or via a bridge member, for example

to the amino group in the nucleus.

Suitable fibre-reactive acylamino groups which can be present in the form of the substituents X, Y or Z or can be contained in the substituents R or $R_1$, in $R_1$ preferably as the substituent B, are especially triazinylamino, diazinylamino (optionally with one or more fused aromatic carbocyclic rings), benzthiazolecarbonylamino, benzthiazolesulphonylamino, thiazolecarbonylamino, thiazolesulphonylamino, benzoxazolecarbonylamino, benzoxazolesulphonylamino, benzimidazolecarbonylamino or benzimidazolesulphonylamino groups having at least one removable reactive substituent on the heterocyclic structure, especially halogen (Cl, Br and F) or sulphonyl groups, such as alkylsulphonyl and arylsulphonyl groups, ammonium groups or hydrazinium groups. Suitable diazinylamino groups are especially pyrimidinylamino, pyrimidinecarbonylamino, phthalazinecarbonylamino and quinoxalinecarbonylamino or quinoxalinesulphonylamino groups with fluorine, chlorine or alkyl- or aryl-sulphonyl groups as removable groups.

Individual examples of suitable fibre-reactive acyl radicals are: mono- or di-halogeno-symmetrical-triazinyl radicals, for example 2,4-dichlorotriazinyl-6, 2-amino-4-chlorotriazinyl-6, 2-alkylamino-4-chlorotriazinyl-6, such as 2-methylamino-4-chlorotriazinyl-6, 2-ethylamino- or 2-propylamino4-chlorotriazinyl-6, 2-β-hydroxyethylamino-4-chlorotriazinyl-6, 2-di-β-hydroxyethylamino-4-chlorotriazinyl-6 and the corresponding sulphuric acid half-esters, 2-diethylamino-4-chlorotriazinyl-6, 2-morpholino- or 2-piperidino-4-chlorotriazinyl-6,2-cyclohexylamino-4-chlorotriazinyl-6, 2-arylamino- and substituted arylamino-4-chlorotriazinyl-6, such as 2-phenylamino4-chlorotriazinyl-6, 2-(o-, m- or p-carboxy- or sulpho-phenyl)amino-4-chlorotriazinyl-6, 2-alkoxy-4-chlorotriazinyl-6, such as 2-methoxy- or ethoxy-4-chlorotriazinyl-6, 2-(phenylsulphonylmethoxy)-4-chlorotriazinyl-6, 2-aryloxy- and substituted aryloxy-4-chlorotriazinyl-6, such as 2-phenoxy-4-chlorotriazinyl-6, 2-(p-sulphophenyl)-oxy-4-chlorotriazinyl-6, 2-(o-, m- or p- methyl- or methoxyphenyl)-oxy-4-chlorotriazinyl-6, 2-alkylmercapto- or 2-arylmercapto- or 2-(substituted aryl)-mercapto-4-chlorotriazinyl-6, such as 2-β-hydroxyethyl)-mercapto-4-chlorotriazinyl-6, 2-phenylmercapto-4-chlorotriazinyl-6, 2-(4'-methylphenyl)-mercapto- 4-chlorotriazinyl-6, 2-(2',4'-dinitro)-phenylmercapto-4-chlorotriazinyl-6, 2-methyl-4-chlorotriazinyl-6, 2-phenyl-4-chlorotriazinyl-6, mono-, di- or tri-halogenopyrimidinyl radicals, such as 2,4-dichloropyrimidinyl-6, 2,4,5-trichloropyrimidinyl-6, 2,4-dichloro-5-nitro- or -5-methyl- or -5-carboxymethyl- or -5-carboxy- or -5-cyano- or -5-vinyl- or -5-sulpho- or -5-mono-, -di- or -trichloromethyl- or -5-carboalkoxy-pyrimidinyl-6, 2,6-dichloropyrimidine-4-carbonyl, 2,4-dichloropyrimidine-5-carbonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulphonyl, 2-chloroquinoxaline-3-carbonyl, 2- or 3-monochloroquinoxaline-6-carbonyl, 2- or 3-monochloroquinoxaline-6-sulphonyl, 2,3-dichloroquinoxaline-6-carbonyl, 2,3-dichloroquinoxaline-6-sulphonyl, 1,4-dichlorophthalazine-6-sulphonyl or -6-carbonyl, 2,4-dichloroquinazoline-7- or -6-sulphonyl or -carbonyl, 2- or 3- or 4-(4',5'-dichloropyridazon-6'-yl-1')-phenylsulphonyl or -carbonyl, β-(4'',5''-dichloropyridazon-6'-yl-1')-ethylcarbonyl, N-methyl-N-(2,4-dichlorotriazinyl-6-)-carbamyl, N-methyl-N-(2-methylamino-4-chlorotriazinyl-6)-carbamyl, N-methyl-N-(2-dimethylamino-4-chlorotriazinyl-6)-carbamyl, N-methyl- or N-ethyl-N-(2,4-dichlorotriazinyl-6)-aminoacetyl, N-methyl-N-(2,3-dichloroquinoxaline-6-sulphonyl)aminoacetyl, N-methyl-N-(2,3-dichloroquinoxaline-6-carbonyl)aminoacetyl, as well as the corresponding bromine and fluorine derivatives of the abovementioned chlorine-substituted heterocyclic radicals, including, for example, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methyl-sulphonyl-4-pyrimidinyl, 2-fluoro-5-carbonamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carbonamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulphonyl-4-pyrimidinyl, 2-fluoro-5-sulphonamido-4-pyrimidinyl, 2-fluoro-5-chloro-6-carbomethoxy-4-pyrimidinyl and 2,6-difluoro-5-trifluoromethyl-4-pyridiminyl; triazine radicals containing sulphonyl groups, such as 2,4-bis-(phenylsulphonyl)-triazinyl-6, 2-(3'-caroxyphenyl)-sulphonyl-4-chlorotriazinyl-6-, 2-(3'-sulphophenyl)-sulphonyl-4-chloro-triazinyl-6- and 2,4-bis-(3'-carboxy-phenylsulphonyl-1')-triazinyl-6; pyrimidine rings containing sulphonyl groups, such as 2-carboxymethyl-sulphonyl-pyrimidinyl-4, 2-methylsulphonyl-6-methyl-pyrimidinyl-4, 2-methylsulphonyl-6-ethyl-pyrimidinyl-4, 2-phenylsulphonyl-5-chloro-6-methyl-pyrimidinyl-4, 2,6-bis-methylsulphonyl-pyrimidinyl-4, 2,6-bis-methylsulphonyl-5-chloro-pyrimidinyl-4, 2,4-bis-methylsulphonyl-pyrimidine-5-sulphonyl, 2-methyl-sulphonyl-pyrimidinyl-4, 2-phenylsulphonyl-pyrimidinyl-4, 2-trichloromethylsulphonyl-6-methyl-pyrimidinyl-4, 2-methylsulphonyl-5-chloro-6-methyl-pyrimidinyl-4, 2-methylsulphonyl-5-bromo-6-methyl-pyrimidinyl-4, 2-methylsulphonyl-5-chloro-6-ethyl-pyrimidinyl-4, 2-methylsulphonyl-5-chloro-6-chloromethylpyrimidinyl-4, 2-methylsulphonyl-4-chloro-6-methyl-pyrimidine-5-sulphonyl, 2-methylsulphonyl-5-nitro-6-methyl-pyrimidinyl-4, 2,5,6-tris-methylsulphonyl-pyrimidinyl-4, 2-methylsulphonyl-5,6-dimethyl-pyrimidinyl-4, 2-ethylsulphonyl-5-chloro-6-methylpyrimidinyl-4, 2-methylsulphonyl-6-chloro-pyrimidinyl-4, 2,6-bis-methylsulphonyl-5-chloro-pyrimidinyl-4, 2-methylsulphonyl-6-carboxy-pyrimidinyl-4, 2-methylsulphonyl-5-sulpho-pyrimidinyl-4, 2-methylsulphonyl-6-carbomethoxy-pyrimidinyl-4, 2-methylsulphonyl-5-carboxy-pyrimidinyl-4, 2-methylsulphonyl-5-cyano-6-methoxy-pyrimidinyl-4, 2-methylsulphonyl-5-chloro-pyrimidinyl-4, 2-sulphoethylsulphonyl-6-methyl-pyrimidinyl-4, 2-methylsulphonyl-5-bromo-pyrimidinyl-4, 2-phenylsulphonyl-5-chloro-pyrimidinyl-4, 2-carboxymethylsulphonyl-5-chloro-6-methyl-pyrimidinyl-4, 2-methylsulphonyl-6-chloropyrimidine-4- and -5-carbonyl, 2,6-bis(methylsulphonyl)-pyrimidine-4- or -5-carbonyl, 2-ethylsulphonyl-6-chloropyrimidine-5-carbonyl, 2,4-bis-(methylsulphonyl)pyrimidine-5-sulphonyl, 2-methylsulphonyl-4-chloro-6-methylpyrimidine-5-sulphonyl or -carbonyl; triazine rings containing ammonium groups, such 2-trimethylammonium-4-phenylamino- or -4-(o-, m- or p-sulphophenyl)-aminotriazinyl-6, 2-(1,1-dimethylhydrazinium)-4-phenylamino- or -4-(o-, m- or p-sulphophenyl)aminotriazinyl-6, 2-(2-isopropylidene-1,1-dimethyl)-hydrazinium-4-phenylamino- or -4-(o-, m- or p-sulphophenyl)-aminotriazinyl-6, 2-N-aminopyrrolidinium- or 2-N-aminopiperidinium-4-phenylamino- or -4-(o-, m- or p-sulphophenyl)-aminotriazinyl 6 and also 4-phenylamino- or 4-(sulphophenylamino)-triazinyl-6 radicals which in the 2-position contain 1,4-bis-azabicyclo[2,2,2]-octane or 1,2-bis-aza-bicyclo-[0,3,3]-octane bonded as a quaternary structure via a nitrogen bond, 2-pyridinium-4-phenylamino- or -4-(o-, m- or p-sulphophenyl)-aminotriazinyl-6 and corresponding 2-oniumtriazinyl-6 radicals which in the 4-position are substituted by alkylamino groups, such as methylamino, ethylamino or β-hydroxyethylamino groups, or alkoxy groups, such as methoxy or alkoxy groups, or aroxy groups, such as phenoxy or sulphophenoxy groups; 2-chlorobenzthiazole-5- or -6-carbonyl or -5- or -6-sulphonyl, 2-arylsulphonyl- or -alkylsulphonyl-benzthiazole-5- or -6-carbonyl or -5- -phenylsulphosulphonylpropionyl, -6-sulphonyl, such as 2-methylsulphonyl- or 2-ethylsulphonyl-benzthiazole-5- or -6-sulphonyl or -carbonyl, 2-phenylsulphonylbenzthiazole-5- or -6-sulphonyl or -carbonyl and the corresponding 2-sulphonyl-benzthiazole-5- or -6-carbonyl or -sulphonyl derivatives which contain sulpho groups in the fused benzene ring, 2-chlorobenzoxazole-5- or -6-carbonyl or -sulphonyl, 2-chlorobenzimidazole-5- or -6-carbonyl or -sulphonyl, 2-chloro-1-methylbenzimidazole-5- or -6-carbonyl or -sulphonyl, 2-chloro-4-methylthiazole-(1,3)-5-carbonyl or -4- or -5-sulphonyl.

Suitable fibre-reactive acyl groups of the aliphatic series (with a direct bond to the nuclear amino group) are, for example: acryloyl, mono-, di- or tri-chloroacryloyl, such as —CO—CH=CH-CL, —CO—CCl=CH$_2$ and —CO—CCl=CH—CH$_3$, also —CO—CCl=CH-=COOH and —CO—CH=CCl—COOH, β-chloropropionyl, 3-phenylsulphosulphonyl-propionyl, 3-methyl-sulphonylpropionyl, 3-phenylsulphonylpropionyl, β-sulphato-ethylaminosulphonyl, vinylsulphonyl, β-chloroethylsulphonyl, β-sulphatoethylsulphonyl, β-methylsulphonyl-ethylsulphonyl, β-phenylsulphonylethylsulphonyl, 2-fluoro-2-chloro-3,3-difluorocyclobutane-1-carbonyl, 2,2,3,3-tetrafluorocyclobutane-carbonyl-1 or -sulphonyl-1, β-(2,2,3,3-tetrafluorocyclobutyl-1)-acryloyl, α- or β-bromoacryloyl, α- or β-alkyl- or -aryl-sulphonyl-acryloyl group, such as α- or β-methylsulphonylacryloyl.

Particularly preferred reactive dyestuffs are those with dibromopropionylamino α-bromoacryloylamino and difluorochloropyrimidylamino group X, Y, Z or B.

As examples of Q there may be mentioned: methylene, 1,1- or 1,2-ethylene, 1,1-, 1,2-, 1,3- or 2,1-propylene, 2,4-butylene-, 3-isobutyl-3,1-propylene, 1-isobutyl-3,1-propylene, 1-cyclohexyl-3,1-propylene, 1,3,3-trimethyl-3,1-propylene, 1-methyl-3,3-diethyl-3,1-propylene and 3,3-dimethyl-3,1-propylene.

As examples of B there may be mentioned: optionally substituted C$_1$-C$_4$-alkyl radicals, alkoxy, preferably C$_1$-C$_4$-alkoxy, alkylmercapto, preferably C$_1$-C$_4$-alkylmercapto, alkylsulphonyl, preferably C$_1$-C$_4$-alkylsulphonyl, halogen atoms such as fluorine, chlorine and bromine, sulphonic acid amide or sulphonic acid ester radicals, carbonamide or carbonic acid ester radicals, nitrile, amino groups, which can be substituted, for example by alkyl or acyl radicals, and optionally substituted arylamino, arylsulphonyl, arylmercapto, aryloxy, arylsulphonylamino, arylaminosulphonyl, aralkylaminosulphonyl, aralkyl and aralkylene radicals, as well as phthalimido-N-methyl, caprolactam-N-methyl and chloroacetylaminomethyl radicals.

A further subject of the invention is a process for the manufacture of dyestuffs which in the acid form correspond to the general formula (I) which is characterised in that compounds of the general formula

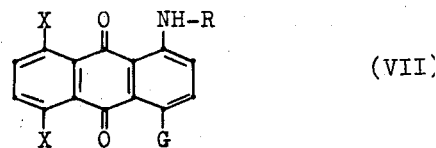

(VII)

in which
R and X have the meaning mentioned in the formula (I) and

G represents a replaceable substituent, preferably halogen, such as, for example, chlorine or bromine, are reacted with amines of the general formula

 (VIII)

in which
R₁ has the meaning mentioned in the formula (I) to give compounds of the general formula

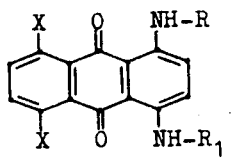 (IX)

in which
R, R₁ and X have the meaning mentioned in the formula (I)

and the compounds thus obtained are sulphonated, OH groups which may be present are converted into sulphuric acid half-ester groups or sulphuric acid half-ester groups which may be present are subsequently saponified.

Compounds of the general formula (VII) can be obtained in various ways.

Thus it is possible to start from 1,5- and/or 1,8-dinitro-anthraquinone, and to react a nitro group with an amine of the formula

 (X)

to give compounds of the formula

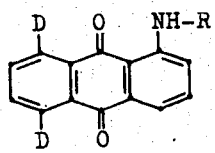 (XI)

in which
R has the abovementioned meaning,
one D represents a nitro group and the other D represents hydrogen.

From compounds of the formula (XI), those of the formula

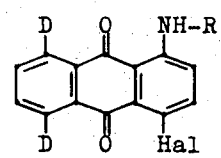 (XII)

in which
R and D have the meaning mentioned and
Hal represents chlorine or bromine
are obtained by the action of halogen, preferably bromine, or halogen-donating agents such as SO₂Cl₂ or SO₂Br₂.

Starting from (XII), further compounds of the formula (VII) can be obtained in various ways:
Reduction in accordance with processes which are in themselves known, for example with iron in mineral acids or organic acids or with the alkali salts of hydrogen sulphide, yields compounds of the formula

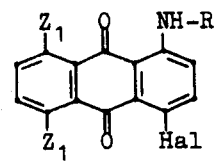 (XIII)

in which
R and Hal have the meaning mentioned in the formula (XII) and
one Z₁ represents an amino group and
the other Z₁ represents hydrogen.

Acylation of (XIII) with carboxylic acids or organic sulphonic acids or their functional derivatives in accordance with methods which are in themselves known, for example in organic solvents and/or water, optionally with the addition of acid-binding agents and/or acylation catalysts, yields compounds of the formula

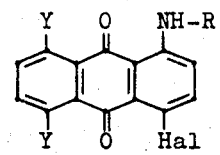 (XIV)

in which
R and Hal have the meaning mentioned in the formula (XII) and
one Y represents an acylamino radical and
the other Y represents hydrogen.

Reaction of compounds of the formula (XII) with amines of the general formula

 (XV)

in which
R₂ represents an optionally substituted alkyl, aralkyl or cycloalkyl radical
yields compounds of the general formula

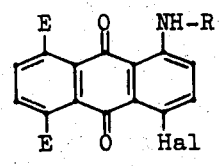 (XVI)

in which
R and Hal have the meaning mentioned in the formula (XII) and
one E represents an NH—R₂ radical and
the other E represents hydrogen and
R₂ has the meaning mentioned.

Another way of obtaining compounds of the general formula (VII) consists of only replacing one halogen atom by an amine of the formula (X) in compounds of the formula

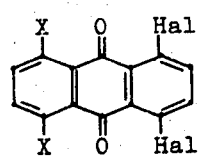 (XVII)

in which
X has the meaning mentioned in (I) and
Hal represents chlorine or bromine.

In that case, in general, a mixture of two isomers is obtained which can optionally be separated at this stage or a subsequent reaction stage in accordance with processes which are in themselves known, such as, for example, recrystallisation from organic solvents or fractionation from aqueous mineral acids, such as, for example, hydrochloric acid or sulphuric acid.

The manufacture of compounds of the formula (XVII) is described, for example, in German Pat. Specifications No. 1,161,252, 1,151,517 and 1,154,490.

This process is particularly advantageous is R represents an optionally substituted araliphatic, aromatic or heteroaromatic radical.

One process variant for the manufacture of (IX) consists of reacting compounds of the formula (XII) with amines of the formula

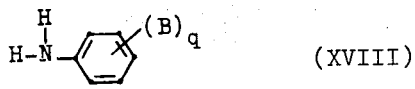
(XVIII)

in which
B represents a substituent or hydrogen and
$q$ represents the numbers 0 – 4 to give compounds of the formula

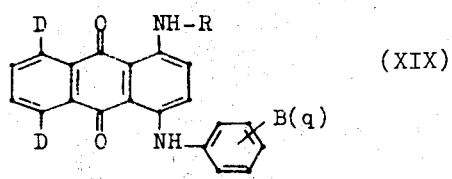
(XIX)

in which
R, B and q have the meaning mentioned,
one D represents a nitro group and
the other D represents hydrogen
and optionally reacting the compounds thus obtained with compounds of the formula $Z_2$—H
in which
$Z_2$ represents an optionally substituted alkyl, cycloalkyl, aralkyl, aryl or heterocycloamino radical to give compounds of the formula

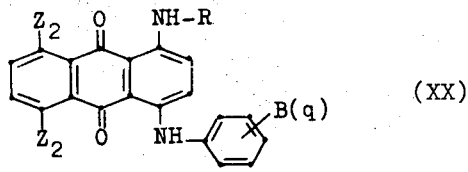
(XX)

in which
R, B, q and $Z_2$ have the meaning mentioned.

A further process variant consists of converting compounds of the formula (I) or (IX), with X = $NO_2$, and compounds of the formula (XIX), into the corresponding compounds with X and D = $NH_2$, by reduction.

A further process variant consists of converting compounds of the formula (I) or (IX) with X = $NH_2$ into the corresponding compounds with X = NH-acyl, by acylation.

A further process variant consists of convering compounds of the formula (I) or (IX), with X = NH-acyl, into the corresponding compounds with X = $NH_2$, by saponification.

A further process variant consists of reacting compounds of the general formula (I) or (IX) with X = $NH_2$, by reaction with such substituted aliphatic, araliphatic, heterocyclic or above all aromatic hydrocarbons as contain at least one substituent replaceable by an amine radical, such as, for example, a bromine atom or a nitro group, examples of such hydrocarbons being, for example, bromobenzene, which can optionally be substituted by one or more halogen, alkoxy, alkyl or alkylcarbonylamino groups, or methyl iodide or ethyl bromide, to give the corresponding compounds in which X represents an amino group substituted by an optionally substituted alkyl, cycloalkyl, aralkyl, heteroalkyl, heteroaryl or aryl radical.

The reaction of the compounds VII, XII, XIII, XIV and XIX with amines of the formulae VIII, XV or XVIII can be carried out in an aqueous, aqueous-organic or preferably organic medium, optionally in the presence of copper and/or copper salts and/or iodine as catalysts and optionally with the addition of acidbinding agents, such as the alkaline earth metal salts or preferably the alkali metal salts of acetic acid or carbonic acid, or organic tertiary bases such as, for example, pyridine.

Temperatures of between about 60°C and 160°C are required for this reaction, depending on the nature of the amine and of the substituents to be replaced. The replacement of chlorine as a rule requires somewhat higher temperatures than that of bromine. The nitro group is already rapidly replaced by alkylamines, cycloalkylamines and aralkylamines below 90°C, whilst it is only replaced with difficulty by arylamines and heteroarylamines even at 130° – 160°C. Higher temperatures are required for the reaction of those arylamines which are positively substituted in both o-positions to the amino group, or those which carry a negative substituent, than for the remaining arylamines.

The time required for the reaction within the indicated temperature range is between 30 minutes and 12 hours. If XII is reacted with amines, very different results can be obtained depending on the nature of the amine. Thus with aliphatic, cycloaliphatic and araliphatic amines the nitro group is preferentially replaced, whilst with aromatic or heteroaromatic amines the halogen atom is preferably replaced under the same reaction conditions. The halogen atom which has not been replaced, or the nitro group which has not been replaced, can then subsequently be replaced by the same or a different amine radical, if appropriate in the same reaction mixture, generally under more severe reaction conditions, for example elevated temperature. If in I, VII or IX one of the radicals R, $R_1$ or X contains one or more primary or secondary amino groups, (these not being directly bonded to the anthraquinone nucleus in the case of X), then these can be acylated, optionally partially.

For this purpose, the chlorides or anhydrides of the acyl radicals listed can be used as acylating agents. They can be either fibre-reactive or fibre-inactive in nature. This reaction can be carried out either with the sulphonated compounds containing amino groups or with the compounds free of sulpho groups, in accordance with procedures which are in themselves known. Acyl radicals of which the amine derivatives are sensitive, or even unstable, towards sulphonating agents, such as, for example, some reactive acylamine radicals or numerous unreactive sulphonyl radicals, must be introduced after the sulphonation of the dyestuff bases. Such reactions are then preferably carried out in an aqueous medium, optionally with addition of small amounts of organic solvents, in the pH range of between 4 and 10.

The sulphonation of the compounds VIII can be carried out with sulphuric acid, sulphuric acid containing $SO_3$, chlorosulphonic acid or mixtures thereof at temperatures of between $-20°$ and $80°C$, but preferably at room temperature or slightly elevated temperature (say up to $50°C$), optionally in the presence of boric acid or in the presence of inorganic salts, for example sodium sulphate (to prevent undesired oxidations). OH groups present in the radicals R, $R_1$ or X are thereby largely converted into the sulphuric acid half-esters. If the reaction is carried out in weakly aqueous sulphuric acids (which can contain up to 15 – 20% of water) at room temperature or in anhydrous sulphuric acid below room temperature, only OH groups bonded to C atoms of alkyl or cycloalkyl radicals are esterified with sulphuric acid. The sulphonation of optionally positively substituted phenyl radicals on the other hand only takes place in anhydrous sulphuric acid or sulphuric acid containing a small amount of $SO_3$. If R, $R_1$ and X represent radicals which cannot be sulphonated, the presence of at least one OH group esterified with sulphuric acid is necessary in the dyestuffs according to the invention. If R, $R_1$ and X represent different radicals which are difficult to sulphonate, it is possible, through suitable choice of the sulphonating agent and/or the temperature, only to sulphonate a part of these radicals. Thus at room temperature a phenylalkylamine radical is in general already sulphonated in 98% strength sulphuric acid, an unsubstituted phenylamine radical or a phenylamine radical substituted by an (alk)oxy group is only sulphonated in anhydrous sulphuric acid, a p-tert.-butylphenylamine radical or a p-acetylaminophenyl radical is only sulphonated in sulphuric acid containing a small amount of $SO_3$, and a phenylamine radical which is negatively substituted, for example by the nitrile group, is only slowly sulphonated in sulphuric acid containing a large amount of $SO_3$, at elevated temperature.

Dyestuffs or dyestuff intermediates, containing sulphonic acid groups, which are obtained in this way can be converted, optionally partially and optionally after prior isolation, into sulphohalides, for example by means of thionyl chloride or thionyl bromide, at room temperature or elevated temperature, and the sulphohalide groups can be partially or completely converted in a known manner into sulphonamide groups by means of optionally substituted aliphatic, araliphatic, cycloaliphatic, aromatic or heterocyclic primary or secondary amines or ammonia in an aqueous, aqueous-organic or organic medium (which can also consist of excess amine). The dyestuffs containing sulphonamide groups, thus obtained, can optionally again be sulphonated and/or sulphated at external hydroxyl groups and/or hydroxyl groups esterified with sulphuric acid can again be saponified. The introduction of sulphonamide groups often brings about a distinct improvement in the solubility compared to the same dyestuffs without the sulphonamide grouping.

Finally, hydroxyl groups located directly on phenyl radicals can also be converted into their sulphuric acid halfesters, for example by reaction of chlorosulphonic acid in the presence of tertiary organic bases, for example pyridine.

Through suitable choice or combination of the possibilities mentioned a large number of variations as regards type, position and number of the groups in the dyestuffs which confer solubility in water is achievable. This is shown, for example, starting from a single dyestuff base in Example 3 of the examples section.

The dyestuffs or their direct intermediate products can be halogenated in accordance with methods which are in themselves known, for example by treatment with chlorine or bromine or with halogen-donating agents such as, for example, sulphuryl chloride or sulphuryl bromide. This can be carried out in solutions or suspensions in water, mineral acids optionally containing water, or organic solvents, or in mixtures of these.

If R or $R_1$ represent positively substituted aryl radicals or X represents a positively substituted arylamine radical, these can be reacted in accordance with a procedure which is in itself known, with compounds which carry a reactive methylene group. This results in one or more linkages of the radical located on the methylene group to the phenyl radical via a methylene bridge. This reaction can be carried out with the dyestuff bases or their sulphonation products.

As radicals with an active methylene group there may be mentioned: N-methylol derivatives of pyrrolidone, propionylamine, benzoylamine, o-carboxybenzoylamine, succinimide, carbamoylamine, carbethoxyamine, chloroacetamine, phthalimide and especially caprolactam. The N-methylol compounds of homologous lactams with 8 – 11 ring members can also be employed.

The new dyestuffs are valuable products which are outstandingly suitable for dyeing and printing natural and synthetic polyamide materials such as wool, silk, polyamide and the like, on which, in part, brilliant dyeings with good to very good fastness properties are obtained. Where the dyestuffs contain fibre-reactive groups, they can, depending on the structure and on the process technique used, be employed in part for dyeing and printing cellulose fibres and regenerated cellulose fibres and in part also particularly advantageously for dyeing natural or synthetic polyamide fibres such as wool and polyamide. Dyestuffs which contain several, or preferably one, difluorochloropyrimidyl radical or an α-bromo-acrylic acid radical are particularly suitable for the latter purpose.

Amongst the dyestuffs without fibre-reactive groups or with groups which are only slightly fibre-reactive (for example dyestuffs which contain a (di)-chloroacetyl radical), those with only one group which confers solubility are particularly suitable for dyeing polyamide fibres from a neutral bath. On polyamide, they generally level out particularly well the stripiness caused by the material.

If above all a high solubility is demanded, the anionically difunctional or polyfunctional dyestuffs will be preferred.

If particular value is attached to good levelling, dyestuffs of low molecular weight will be preferred whilst if high demands are made of fastness to wet processing, those of higher molecular weight will be employed. Compounds with $X = NO_2$ or $NH_2$, of the general formulae I and IX, are themselves dyestuffs, in part with a substantial level of fastness, but are also intermediate products for the manufacture of dyestuffs with $X = $ an $NH_2$ group substituted by hydrocarbon or above all with $X = $ acylamino.

In the examples which follow, the temperatures quoted denote degrees Centigrade.

EXAMPLE 1 a. 10 g of 1-isopropylamino-4-m-toluidino-8-nitro-anthraquinone are dissolved in 50 ml of monohydrate at room temperature and 15 ml of 20% strength oleum are progressively added at the same temperature. After about 5 hours, neither dyestuff base nor monosulphonated product is chromatographically detectable. The mixture is stirred into 600 ml of cold concentrated sodium chloride solution and the product is filtered off and washed with 20% strength sodium chloride solution until neutral. After drying at 60° in vacuo, 17 g of a dyestuff are obtained, which in the acid form correspond to the formula

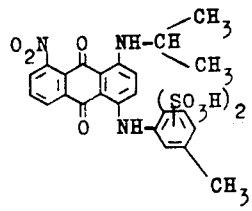

b. The dyestuff base employed in a) can be obtained as follows: 60 g of 1-isopropylamino-4-bromo-8-nitro-anthraquinone, 120 ml of m-toluidine, 20.5 g of potassium acetate and 0.05 g of Cu$^I$ chloride are warmed to 100°–105° until only traces of the starting material remain detectable (approx. 4 hours are required). The mixture is diluted with 240 ml of methanol at 70° and is subsequently stirred for some time at 50°–60° and the product is filtered off hot, successively washed with hot methanol and hot water, and dried at 100°. Yield 45 g.

EXAMPLE 2 a. 12 g of 1-β-hydroxyethylamino-4-p-tert.butylanilino-5-nitro-anthraquinone are dissolved in 50 ml of cold monohydrate and sufficient 20% strength oleum is progressively added until chromatographically no starting material and only traces of the initially produced sulphation product are detectable (approx. 20 ml are required). The melt is added to 1,000 ml of saturated sodium chloride solution at below 20°, whilst stirring, and the resulting precipitate is filtered off. The filter residue is stirred with 250 ml of water, the mixture is adjusted to pH 7 with dilute sodium hydroxide solution and the product is filtered off, washed with half-concentrated sodium chloride solution and dried. 14.6 g of a dyestuff which in the acid form corresponds to the formula

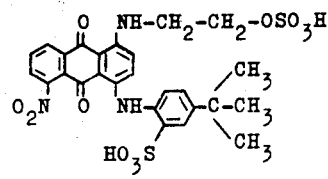

and which dyes polyamide fibres in a greenish-tinged blue shade, are obtained.

b. The dyestuff base employed in a) is obtained by reaction of 1-hydroxyethylamino-5-nitro-4-bromo-anthraquinone with p-tert.butylaniline, analogously to Example 1 b).

c. 5 g of the dyestuff obtained according to a) are treated for 1 hour in 50 ml of 2 N hydrochloric acid at 95°–100°, thereby yielding 3.2 g of the dyestuff which in the acid form corresponds to the formula

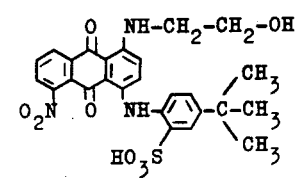

and dyes polyamide fibres in blue shades.

Using the methods described in Examples 1 and 2 and employing appropriate starting compounds, the dyestuffs of the general formula

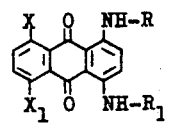

listed in Table I are obtained. They dye polyamide in the indicated colour shades.

Table I

| No. | R | R$_1$ | X | X$_1$ | Colour shade |
|---|---|---|---|---|---|
| 1 | —CH(CH$_3$)$_2$ | —C$_6$H$_4$—SO$_3$H | NO$_2$ | H | greenish-tinged blue |
| 2 | " | —C$_6$H$_3$(CH$_3$)(SO$_3$H)$_2$ | H | NO$_2$ | strongly greenish-tinged blue |
| 3 | " | —C$_6$H$_3$(CH$_3$)—SO$_3$H | NO$_2$ | H | greenish-tinged blue |
| 4 | " | —C$_6$H$_3$(OCH$_3$)(SO$_3$H)$_2$ | H | NO$_2$ | green-blue |
| 5 | —CH(CH$_3$)(CH$_2$—CH$_3$) | —C$_6$H$_3$(NH—COCH$_3$)(SO$_3$H)$_2$ | NO$_2$ | H | blue-green |

Table I-continued

| No. | R | R$_1$ | X | X$_1$ | Colour shade |
|---|---|---|---|---|---|
| 6 | $-CH(CH_2-OSO_3H)(CH_2-CH_3)$ | phenyl with $SO_3H$ and $-N(CH_3)-CO-CH_3$ | H | $NO_2$ | greenish-tinged blue |
| 7 | $-CH(CH_2-CH_3)_2$ | phenyl with $-Br$ and $(SO_3H)_2$ | $NO_2$ | H | blue |
| 8 | $-CH(CH_3)_2$ | phenyl with $-NH_2$ and $(SO_3H)_2$ | H | $NO_2$ | greenish-tinged blue |
| 9 | $-CH(CH_3)_2$ | phenyl with $CH_3$, $SO_3H$, $-CH_3$, $CH_3$ | H | $NO_2$ | blue |
| 10 | cyclohexyl–$CH_3$ | phenyl with $CH_3$ and $(SO_3H)_2$ | $NO_2$ | H | strongly greenish-tinged blue |
| 11 | cyclohexyl | phenyl with $OCH_3$ and $(SO_3H)_2$ | H | $NO_2$ | green-blue |
| 12 | cyclohexyl–$OSO_3H$ | phenyl with $-CH_3$ and $SO_3H$ | H | $NO_2$ | blue-green |
| 13 | $-CH_3$ | phenyl with $CH_3$ and $(SO_3H)_2$ | $NO_2$ | H | greenish-tinged blue |
| 14 | $-CH_2-CH_2OH$ | phenyl with $SO_3H$ and $O-CH_2-CH_2-OH$ | H | $NO_2$ | greenish-tinged blue |
| 15 | $-CH(CH_3)_2$ | phenyl with $CH_3$, $-C(CH_3)_3$, $SO_3H$ | $NO_2$ | H | greenish-tinged blue |
| 16 | $-CH_2-CH_2-CH_3$ (i.e. $-CH_2-CH(CH_3)$ branch) | phenyl with $-O-CH_2-CH_2-OSO_3H$ and $SO_3H$ | H | $NO_2$ | greenish-tinged blue |
| 17 | cyclohexyl–$C(CH_3)_3$ | phenyl with $SO_3H$ and $O-CH_2-CH_2-OSO_3H$ | H | $NO_2$ | greenish-tinged blue |
| 18 | $-CH_3$ | phenyl with $-NH-CO-CH_3$ and $SO_3H$ | H | $NO_2$ | strongly greenish-tinged blue |
| 19 | cyclohexyl | phenyl with $-NH-CO-CH_2-OH$ and $SO_3H$ | $NO_2$ | H | strongly greenish-tinged blue |

Table I-continued

| No. | R | R₁ | X | X₁ | Colour shade |
|-----|---|-----|---|-----|--------------|
| 20 | —C₆H₄—COCH₃ | —C₆H₃(CH₃)(SO₃H)₂ | H | NO₂ | bluish-tinged green |
| 21 | —CH(CH₃)₂ | —C₆H₃(OCH₃)(SO₃H) | NO₂ | H | strongly greenish-tinged blue |
| 22 | —C₆H₁₁—O—SO₃H | —C₁₀H₆—SO₃H | H | NO₂ | strongly greenish-tinged blue |
| 23 | —CH(CH₃)₂ | —C₆H₄—OSO₃H | NO₂ | H | green-blue |
| 24 | —CH(CH₃)(CH₂—OSO₃H) | —C₆H₄(SO₃H)—CH=CH—C₆H₄(SO₃H) | H | NO₂ | green-blue |
| 25 | —CH(CH₃)₂ | —C₆H₄(SO₃H)—O—CH₂—CH(OH)—CH₂(OH) | NO₂ | H | greenish-tinged blue |
| 26 | —CH₂—CH=CH₂ | —C₆H₄(SO₃H)—CH₃ | H | NO₂ | greenish-tinged blue |
| 27 | —CH₂—CH(CH₃)—CH₃ | —C₆H₃(SO₃H)(OCH₃) | H | NO₂ | strongly greenish-tinged blue |

EXAMPLE 3 a) 5 g of 1-β-hydroxyethylamino-4-tert.butylanilino-5-β-phenylethylamino-anthraquinone are dissolved in 50 ml of 95% strength sulphuric acid whilst cooling with ice and the mixture is stirred at room temperature until chromatographically only traces of the base employed remain detectable in a sample taken.

After the customary working up, the dyestuff of the formula

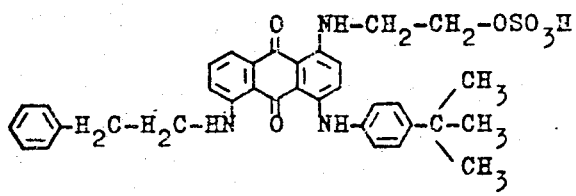

is obtained. It dyes polyamide fibres in blue shades.

b) The colour base employed in a) was obtained by reaction of 1-hydroxyethylamino-4-p-tert.butylanilino-5-nitro-anthraquinone with β-phenylethylamine at 100 – 105°.

The same product is obtained by reaction of 1-hydroxyethylamino-5-β-phenyl-ethylamino-4-bromo-anthraquinone (manufactured from 1-hydroxyethylamino-4-bromo-5-nitroanthraquinone by reaction with β-phenylethylamine) with tert.-butylaniline.

Further acid dyestuffs can be manufactured as follows from this colour base:

c. 5 g of colour base are dissolved in 25 ml of monohydrate at room temperature and the mixture is stirred until only traces of the product obtained according to a) are still present The mixture is poured into almost saturated sodium chloride solution whilst stirring and the precipitate is filtered off, stirred up in 150 ml of water, adjusted to pH 7 with dilute sodium hydroxide solution and precipitated with 20 g of solid sodium chloride. The product is filtered off, washed with a little 20% strength sodium chloride solution and dried in vacuo at 60°. 8.2 g of dyestuff of the formula

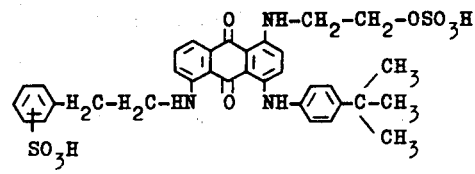

are obtained. The dyestuff dyes polyamide fibres in greenish-tinged blue shades.

d. 5 g of colour base are dissolved in 25 ml of monohydrate at room temperature, 7 ml of 20% strength oleum are subsequently added and the mixture is stirred for a further 5 hours at room temperature. It is worked up analogously to c and 8.3 g of a dyestuff of the formula

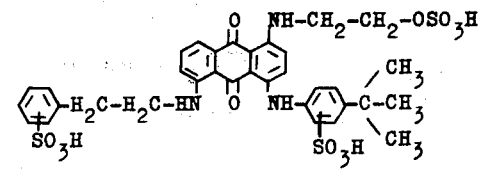

are obtained, which dyes wool from an acid bath in greenish-tinged blue shades of good fastness to light.

e. 5 g of the product obtained according to c) are treated for 1½ hours at 95° – 100° in 50 ml of 2 N hydrochloric acid. The dyestuff transiently dissolves and thereafter the saponification product precipitates, initially in an oily form which solidifies on cooling. The product is filtered off cold, covered with dilute hydrochloric acid, washed with 10% strength sodium chloride solution until neutral and dried in vacuo at 60°. The resulting dyestuff corresponds to the formula

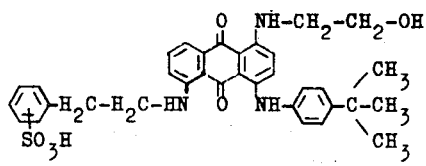

and dyes polyamide fibres in muted blue shades.

f. The procedure described in e is followed by 5 g of the dyestuff obtained according to d are employed. The dyestuff obtained corresponds to the formula

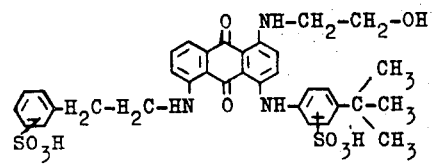

and dyes wool in similar shades to the dyestuff described under d.

EXAMPLE 4 a. 6 g of 1-cyclohexylamino-4-β-phenylethylamino-5-β-hydroxyethylamino-anthraquinone are dissolved in 25 ml of anhydrous sulphuric acid, 2.5 ml of 20% strength oleum are added and the mixture is stirred for 1½ hours at room temperature. The melt is added to saturated sodium chloride solution at below 15°, the resulting precipitate is filtered off, the filter residue is stirred up in water (150ml), the pH is adjusted to 7 with dilute sodium hydroxide solution and the product is filtered off and rinsed with a little half-concentrated sodium chloride solution. 10.4 g of dry product which in the acid form corresponds to the formula

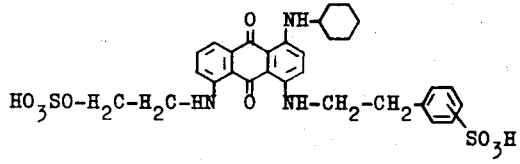

and dyes polyamide fibres in clear blue shades are obtained.

The colour base employed in a is produced by reaction of 1-cyclohexalamino-5-nitro-4-bromo-anthraquinone with ethanolamine at 80° – 85° and further reaction with β-phenyl-ethylamine/potassium acetate/copper $^I$ chloride at 80° – 85° to give 1-cyclohexylamino-4-β-phenylethylamino-5-β-hydroxyethyl-amino-anthraquinone.

6 g of the product obtained according to a are dissolved in 60 ml of 2 N HCl and the solution is warmed to 95°–100° for 1 hour. After working up as usual, the dyestuff of the formula

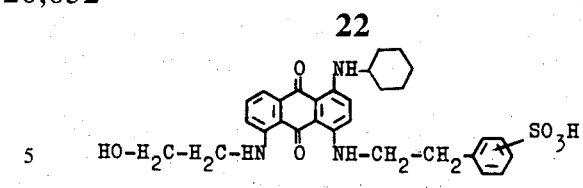

is obtained. It dyes polyamide fibres, by any dyeing method, in strong blue shades.

EXAMPLE 5 a. 4.5 g of 1-β-phenylethylamino-4-p-toluidino-5-methylamino-anthraquinone are dissolved in 22 ml of anhydrous sulphuric acid at room temperature and a total of 9 ml of 20% strength oleum is added over the course of 5 hours at the same temperature. After the customary working up, 5.9 g of the dyestuff of the formula

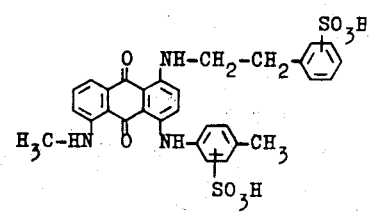

are obtained, which dyes polyamide fibres in a blue-green shade.

b. The base employed in a) is obtained by reaction of 1,4-dichloro-5-methylamino-anthraquinone with β-phenylethylamine/potassium acetate at 100°–105°, reaction of the mixture of 1-β-phenylethylamino-4-chloro-5-methylamino-anthraquinone and 1-β-phenylethylamino-4-chloro-8-methylamino-anthraquinone, thereby obtained, with p-toluidine in the presence of potassium acetate and copper$^I$ chloride and iodine at 130°–140° to give a mixture of 1-β-phenylethylamino-4-p-toluidino-5-methylamino-anthraquinone and 1-β-phenylethylamino-4-p-toluidino-8-methylamino-anthraquinone, and fractional precipitation from sulphuric acid.

If the mixture is sulphonated as described in a), an isomer mixture of the dyestuff described in a) and the dyestuff of the formula

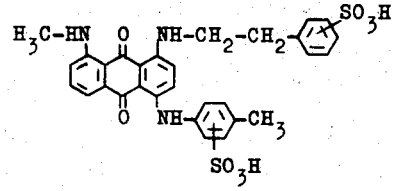

is obtained, which dyes polyamide fibres in a similar shade to the pure dyestuff obtained according to a.

EXAMPLE 6 a. 5 g of 1-isopropylamino-4-m-toluidino-5-cyclohexylamino-anthraquinone are sulphonated with anhydrous sulphuric acid/20% strength oleum at room temperature. The dyestuff of the formula

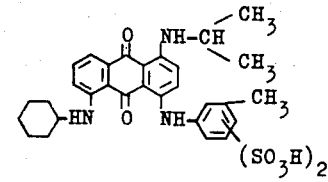

is thereby obtained, which dyes wool in green-blue shades.

b. The colour base employed in a) was obtained by reaction of 1-isopropylamino-4-bromo-5-nitro-anthraquinone with cyclohexylamine/potassium acetate/copper[I] chloride at 75°–80° and subsequent reaction of the 1-isopropylamino-4-bromo-5-cyclohexylamino-anthraquinone thereby obtained with m-toluidine/potassium acetate/copper[I] chloride at 80° – 85°.

EXAMPLE 7 a. 3 g of 1-isopropylamino-4-pyridylamino-(2') -5-anilinoanthraquinone are dissolved in 30 ml of monohydrate and 20% strength oleum is progressively added at room temperature until no further starting material is detectable (approx. 18 ml). After the usual working up (sodium chloride; pH 2–3) the dyestuff of the formula

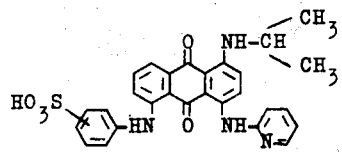

is obtained, which dyes polyamide fibres in a blue shade.

b. The starting product is obtained by reaction of 1-isopropylamino-4-pyridylamino-(2')-5-amino-anthraquinone (Table III, No. 43) with bromobenzene in the presence of potassium acetate and copper[I] chloride and copper bronze.

EXAMPLE 8 a. 3 g of 1-cyclohexylamino-4-o-anisidino-5-anilinoanthraquinone are dissolved in 14 ml of cold 98% strength sulphuric acid and thereafter approx. 8 ml of 20% strength oleum are added. After working up in the usual manner (sodium chloride; pH 7) 6 g of the dyestuff of the formula

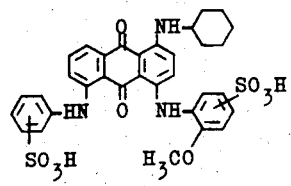

are obtained, which dyes polyamide fibres in greenish-tinged blue shades.

b. The base employed in a) is obtained by reaction of 1-cyclohexylamino-4-o-anisidino-5-amino-anthraquinone with bromobenzene/potassium acetate/copper powder activated with iodine/copper[I] chloride at 156° – 160°.

EXAMPLE 9 a. 6 g of 1-cyclohexylamino-4-mesidino-5-β-hydroxyethylamino-anthraquinone are dissolved in 30 ml of 96% strength sulphuric acid, 2 g of N-methylolcaprolactam are added at 10°–20° and the mixture is stirred for a further 30 minutes. After working up, a product is obtained which essentially consists of the dyestuff of the formula

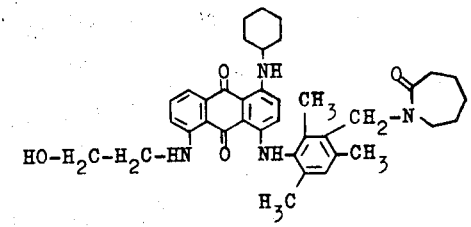

b. If this product is esterified in anhydrous sulphuric acid and subsequently sulphonated in 20% strength oleum, the dyestuff of the formula

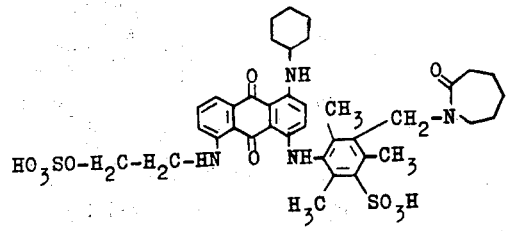

is obtained, which dyes polyamide fibres in blue shades.

The product employed in a is manufactured as follows:

c. 1-Cyclohexylamino-4-bromo-5-β-hydroxyethylamino-anthraquinone obtained according to Example 4 b), is reacted with mesidine/potassium acetate/copper[I] chloride at 120°–140° and the product is subsequently precipitated with hydrochloric acid.

The following dyestuffs, which correspond to the general formula

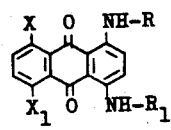

are obtained in accordance with the methods described in Examples 3–9, using appropriate starting compounds. The dyestuffs dye polyamide in the colour shades indicated.

Table II

| | R | $R_1$ | X |
|---|---|---|---|
| 1 | $-CH(CH_3)_2$ | phenyl with $OCH_3$ and $(SO_3H)_2$ | $-NH-CH_3$ |
| 2 | '' | phenyl with $SO_3H$ and $O-CH_2-CH_2-OH$ | H |
| 3 | '' | phenyl with $-C(CH_3)_3$ and $SO_3H$ | $-NH-CH_2-CH_2-OSO_3H$ |
| 4 | $-CH(CH_3)(CH_2-CH_3)$ | phenyl with $-NH-CO-CH_3$ and $SO_3H$ | H |
| 5 | $-CH(CH_3)_2$ | phenyl with $-N(CH_3)-CO-CH_3$ and $SO_3H$ | $-NH-CH(CH_3)_2$ |

$$\text{anthraquinone with } X, X_1, NH-R, NH-R_1$$

| | R | $R_1$ | X |
|---|---|---|---|
| 6 | cyclohexyl | phenyl with $NH-CO-CH_3$ and $(SO_3H)_2$ | H |
| 7 | $-CH(CH_2-OSO_3H)(CH_2-CH_3)$ | phenyl with $SO_3H$ and $CH_3$ | $-NH-CH_2-CH_2-OCH_3$ |
| 8 | $-\text{cyclohexyl}-OSO_3H$ | cyclohexylphenyl with $SO_3H$ | $-NH-CH_2-CH_2-CN$ |
| 9 | $-CH_2-CH_2-OSO_3H$ | phenyl with Br and $SO_3H$ | $-NH-CH_2-CH_2-Cl$ |
| 10 | $-CH_3$ | phenyl with $-NH-CO-CH_2-OSO_3H$ and $SO_3H$ | $NH-\text{cyclohexyl}$ |
| 11 | $-CH_3$ | phenyl with $NH_2$ and $(SO_3H)_2$ | H |

Table II-continued

| | R | $R_1$ | X |
|---|---|---|---|
| 12 | $-CH_2-CH=CH_2$ | Ph($SO_3H$)$-O-CH_2-CH_2-OSO_3H$ | $NH-$Ph$-NH_2$ |
| 13 | $-CH_2-CH_2-$Ph($SO_3H$) | Ph($CH_3$)($SO_3H$)$_2$ | H |
| 14 | $-CH(CH_3)-CH_2-CH_2-$Ph($SO_3H$) | Ph$-CH_3$($SO_3H$) | $NH-$Ph$-OSO_3H$ |
| 15 | $-$Ph($CH_3$)($SO_3H$)$_2$ | $-$Ph($SO_3H$)$-C(CH_3)_3$ | $NH-CH_2-$Ph |
| 16 | $-CH(CH_3)_2$ | $-$Ph($SO_3H$)$-OCH_3$ | $NH-CH_2-$Ph($SO_3H$) |
| 17 | $-CH(CH_2CH_3)_2$ | $-$Ph$-OSO_3H$ | H |
| 18 | $-$Ph | $-CH_2-CH_2-$Ph($SO_3H$) | $NH-CH_2-CH_2-$Ph($SO_3H$) |
| 19 | $-CH_2-CH_2-$Ph($SO_3H$) | $-$Ph$-SO_2-NH_2$ | $NH-CH(CH_3)-CH_2-CH_2-$Ph($SO_3H$) |
| 20 | " | Ph($OCH_3$)($SO_3H$)$-CH_2-N$(caprolactam) | H |
| 21 | $-$Ph($CN$) | $-$Ph($CH_3$)($SO_3H$)$_2$ | $NH-CH(CH_2-CH_2-$Ph($SO_3H$))$(CH_2-CH(CH_3)_2)$ |
| 22 | $-CH(CH_3)_2$ | $-$Ph($CH_3$)($SO_3H$)($C_2H_5$) | $-NH-CH_2-CH_2-$Ph($SO_3H$) |
| 23 | $-CH(CH_3)_2$ | $-$Ph | H |

Table II-continued

| | R | R₁ | X |
|---|---|---|---|
| 24 | $-CH(CH_3)_2$ | -C₆H₃(SO₃H)-NH-CO-CH₃ | $NH-C_6H_4-SO_3H$ |
| 25 | -C₆H₁₁ | $-CH_2-CH_2-C_6H_4-SO_3H$ | $NH-C_6H_3(SO_3H)-OCH_3$ |
| 26 | $-CH_2-CH_2-CH_2-OSO_3H$ | -C₆H₂(CH₃)(SO₃H)(C₂H₅)(CH₃) (2,4,6-substituted with -C₂H₅) | H |
| 27 | $-CH(CH_3)_2$ | $-NH-CH_2-CH_2-OSO_3H$ | $NH-C_6H_3(SO_3H)-CH_3$ |
| 28 | $-CH_2-CH(CH_3)_2$ | -C₆H₃(CH₃)(SO₃H)₂ | H |
| 29 | $-CH_2-CH_2-C_6H_4-SO_3H$ | $-C_6H_4-O-SO_3H$ | H |
| 30 | -C₆H₁₁ | -C₆H₃(OCH₃)(SO₃H)₂ | H |
| 31 | $-CH(CH_3)_2$ | -C₆H₃(NH-CO-CH₃)(SO₃H)₂ | $-NH-(CH_2)_{11}-CH_3$ |
| 32 | $-CH(CH_3)-CH_2-CH_2-C_6H_4-SO_3H$ | $-C_6H_3(S-CH_2-CH_2-OH)(SO_3H)$ | H |
| 33 | $-NH-CH_2-CH(OSO_3H)-CH_3$ | -C₆H₃(SO₃H)-C(CH₃)₃ | H |
| 34 | $-C_6H_4-OCH_3$ | -C₆H₃(CH₃)(SO₃H)₂ | $-NH-CH_2-CH=CH_2$ |

| | X₁ | Colour shade | | X₁ | Colour shade |
|---|---|---|---|---|---|
| 1 | H | greenish-tinged blue | 5 | H | greenish-tinged blue |
| 2 | $-NH-CH_3$ | strongly greenish-tinged blue | 6 | $-NH-CH_2-CH(CH_3)_2$ | greenish-tinged blue |
| 3 | H | strongly greenish-tinged blue | 7 | H | greenish-tinged blue |
| 4 | $-NH-CH_2-CH_2-OSO_3H$ | strongly greenish-tinged blue | 8 | H | greenish-tinged blue |

Table II-continued

| | X₁ | Colour shade | | X₁ | Colour shade |
|---|---|---|---|---|---|
| 9 | H | blue | 21 | H | blue-green |
| 10 | H | greenish-tinged blue | 22 | H | blue |
| 11 | NH—CH(CH₃)₂ | greenish-tinged blue | 23 | NH—C₆H₃(SO₃H)₂Br | blue |
| 12 | H | greenish-tinged blue | 24 | H | greenish-tinged blue |
| 13 | NH—C₆H₄—C(CH₃)₃ | greenish-tinged blue | 25 | H | blue |
| | | | 26 | NH—C₆H₄—NH—CO—CH₃ | blue |
| 14 | H | strongly greenish-tinged blue | 27 | H | blue |
| 15 | H | blue-green | 28 | —NH—(pyridyl) | somewhat greenish-tinged blue |
| 16 | H | greenish-tinged blue | 29 | —C₆H₁₁ | greenish-tinged blue |
| 17 | NH—CH₂—CH₂—C₆H₄—SO₃H | strongly greenish-tinged blue | 30 | —NH—C₆H₄—NH₂ | greenish-tinged blue |
| 18 | H | clear, somewhat greenish-tinged blue | 31 | H | greenish-tinged blue |
| 19 | H | greenish-tinged blue | 32 | NH—(CH₂—CH₂O)₂—CH₃ | somewhat greenish-tinged blue |
| 20 | NH—C(CH₃)(H)—CH₂—C(CH₃)(H)—C₆H₄—SO₃H | greenish-tinged blue | 33 | —NH—CH₂—CH₂—NH₂ | greenish-tinged blue |
| | | | 34 | H | greenish-tinged blue |

EXAMPLE 10 a. 100 g of 1-isopropylamino-4-m-toluidino-8-amino-anthraquinone are dissolved in 500 ml of cold sulphuric acid monohydrate. 150 ml of 20% strength oleum are added and the mixture is further stirred, whilst cold, until starting material is no longer detectable in a sample which is taken and chromatographed. After the customary working up, the dyestuff of the formula

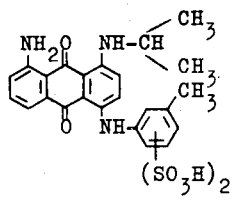

is obtained, which dyes wool in light-fast strong greenish-tinged blue shades.

The same dyestuff is also obtained by reduction of the corresponding 8-nitro dyestuff with aqueous sodium sulphide or by saponification of the corresponding 8-acetylamino dyestuff.

b. The dyestuff base employed in a is obtained by reaction of 1-isopropylamino-4-bromo-8-amino-anthraquinone with m-toluidine/potassium acetate/copper¹ chloride at 100° – 155°.

It can also be obtained by reduction of 1-isopropylamino4-m-toluidino-8-nitro-anthraquinone with aqueous sodium sulphide at about 90° – 95°C. as well as by saponification of 1-isopropylamino-4-m-toluidino-8-acetylamino-anthraquinone with 70% strength sulphuric acid at 60° – 70°C.

EXAMPLE 11 a. 3.5 g of the compound

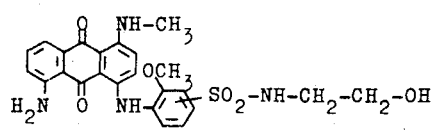

are dissolved in 20 ml of cold anhydrous sulphuric acid and the mixture is stirred for a further 20 minutes. The solution is stirred into half-concentrated sodium chloride solution at below 20° and the resulting precipitate is filtered off. The filter residue is stirred into 150 ml of 10% strength sodium chloride solution, the pH is adjusted to 7 with sodium hydroxide solution and the product is filtered off, washed with cold 5% strength sodium chloride solution and dried in vacuo. 4.3 g of the sulphuric acid half-ester of the compound of the above formula, which dyes polyamide fibres in blue-green shades, are obtained.

The starting product is obtained by reaction of 1-methylamino-4-bromo-5-amino-anthraquinone with o-anisidine/potassium acetate/copper$^I$ chloride at 100° – 110°, further reaction of the 1-methylamino-4-o-anisidino-5-amino-anthraquinone thus obtained with chlorosulphonic acid at below 10° and subsequently with thionyl chloride at 40° – 50°, and finally reaction with ethanolamine at 55° – 60°.

EXAMPLE 12 a. 5 g of 1-$\beta$-phenylethylamino-4-p-tertiary-butylanilino-5(8)-amino-anthraquinone are disulphonated at room temperature in 30 ml of anhydrous sulphuric acid containing 10 ml of 20% strength oleum. After the customary working up, 7 g of an isomer mixture which in the acid form corresponds to the formula

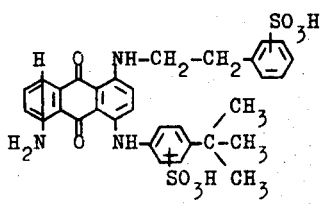

and dyes wool in strongly greenish-tinged blue shades are obtained.

The starting product was obtained by reaction of 1,4-dibromo-5-amino-anthraquinone with $\beta$-phenylethylamine/potassium acetate at 90° – 100° and subsequent reaction of the mixture of 1-$\beta$-phenylethylamino-4-bromo-5-amino-anthraquinone and 4-$\beta$-phenylethylamino-1-bromo-5-amino-anthraquinone, thereby obtained, with p-tertiary-butylaniline/potassium acetate/copper$^I$ chloride at 145° – 150°.

EXAMPLE 13 a. 4.6 g of chlorosulphonic acid are added dropwise to 25 ml of pyridine at 0° – 5°; 2.5 g of 1-isopropylamino-4-(p-hydroxy-phenylamino)-8-amino-anthraquinone are introduced into this solution at below 20° and the mixture is further stirred overnight, in the cold. Chromatographically, no further starting material is now detectable. After the customary working up, the dyestuff of the formula

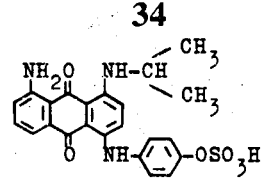

is obtained, which dyes polyamide fibres in a strongly greenishtinged blue shade.

The starting product is obtained by reaction of 1-isopropylamino-4-bromo-8-amino-anthraquinone with p-aminophenol in dimethylformamide in the presence of copper$^I$ chloride and potassium acetate at 55° – 60°.

EXAMPLE 14 a. 5 g of 1-(3'-cyanoanilino)-4-m-toluidino-5-amino-anthraquinone are dissolved in 40 ml of anhydrous sulphuric acid at room temperature, 12 ml of 20% strength oleum are added over the course of 1 hour and the mixture is stirred for a further 2 hours. After the customary working up, 8.5 g of the dyestuff of the formula

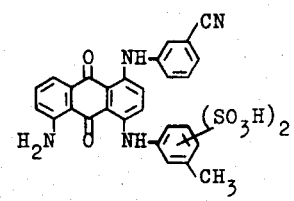

are obtained, which dyes polyamide fibres in a bluish-tinged green shade.

The starting compound was obtained by reaction of 1-(3'-cyanoanilino)-4-chloro-5-amino-anthraquinone with m-toluidine/potassium acetate/copper$^I$ chloride at 110°–120°.

If one of the methods described in Examples 10 – 14 is followed and the appropriate starting compounds are used, the dyestuffs of the formula

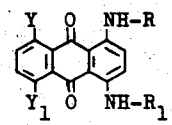

listed in Table III are obtained, which dye polyamide in the colour shades indicated.

Table III

| Serial No. | R | $R_1$ | Y | $Y_1$ | Colour shade |
|---|---|---|---|---|---|
| 1 | –CH(CH₃)₂ | –⟨⟩–CH₃, SO₃H | H | NH₂ | greenish-tinged blue |
| 2 | –⟨⟩ | –⟨⟩–OCH₃, SO₃H | H | NH₂ | greenish-tinged blue |
| 3 | –⟨⟩ | –⟨⟩–OCH₃, (SO₃H)₂ | H | NH₂ | greenish-tinged blue |

Table III-continued

| Serial No. | R | R₁ | Y | Y₁ | Colour shade |
|---|---|---|---|---|---|
| 4 | —CH(CH₃)₂ | phenyl with OCH₃ and (SO₃H)₂ | NH₂ | H | greenish-tinged blue |
| 5 | —CH(CH₃)(CH₂—CH₃) | phenyl with —O—CH₂—CH(OH)—CH₂OH and SO₃H | H | NH₂ | greenish-tinged blue |
| 6 | —CH(CH₂—OSO₃H)(CH₂—CH₃) | phenyl with —NH—CO—CH₃ and SO₃H | H | NH₂ | strongly greenish-tinged blue |

$$\begin{array}{c} Y\quad O\quad NH\!-\!R \\ \text{[anthraquinone ring system]} \\ Y_1\quad O\quad NH\!-\!R_1 \end{array}$$

| Serial No. | R | R₁ | Y | Y₁ | Colour shade |
|---|---|---|---|---|---|
| 7 | cyclohexyl | phenyl with CH₃ and (SO₃H)₂ | NH₂ | H | greenish-tinged blue |
| 8 | cyclohexyl | phenyl with OCH₃ and (SO₃H)₂ | H | NH₂ | greenish-tinged blue |
| 9 | —CH(CH₃)₂ | phenyl with NH—CO—CH₃ and (SO₃H)₂ | NH₂ | H | greenish-tinged blue |
| 10 | —CH₂—CH₂—OSO₃H | —CH₂—CH₂—phenyl-SO₃H | H | NH₂ | blue |
| 11 | —CH₂—CH₂—OSO₃H | phenyl with —NH—CO—CH₃ and SO₃H | H | NH₂ | blue |
| 12 | —CH(CH₃)₂ | phenyl with CH₃ and SO₃H | NH₂ | H | blue |
| 13 | —CH₃ | phenyl with CH₃ and (SO₃H)₂ | H | NH₂ | blue |
| 14 | —CH₃ | phenyl with SO₃H and O—CH₂—CH₂—OH | NH₂ | H | greenish-tinged blue |
| 15 | —CH₃ | phenyl with SO₃H and O—CH₂—CH₂—OSO₃H | H | NH₂ | greenish-tinged blue |
| 16 | —CH(CH₃)₂ | phenyl with SO₃H | H | NH₂ | blue |
| 17 | " | phenyl with SO₃H and CH₃ | NH₂ | H | somewhat greenish-tinged blue |

Table III-continued

| Serial No. | R | R₁ | Y | Y₁ | Colour shade |
|---|---|---|---|---|---|
| 18 | " | 4-(NH-CO-CH₃)-phenyl-SO₃H | H | NH₂ | greenish-tinged blue |
| 19 | -C₆H₁₀-CH₃ (4-methylcyclohexyl) | Br-phenyl-(SO₃H)₂ | H | NH₂ | blue |
| 20 | -CH₂-CH(CH₃)₂ | -CH(CH₃)-CH₂-CH₂-phenyl-SO₃H | NH₂ | H | blue |
| 21 | -CH(CH₃)₂ | -phenyl(SO₃H)-O-CH₂-CH₂-OSO₃H | H | NH₂ | greenish-tinged blue |
| 22 | " | -phenyl(CH₃)(SO₃H)(C₂H₅) | NH₂ | H | clear blue |
| 23 | -CH(CH₂-OSO₃H)(CH₂-CH₃) | -phenyl(OCH₃)(SO₂-NH₂) | H | NH₂ | greenish-tinged blue |
| 24 | " | -phenyl(CH₃)(SO₂-NH-CH₂-CH₂-phenyl-SO₃H) | NH₂ | H | greenish-tinged blue |
| 25 | " | -phenyl(OCH₃)(SO₃H)-CH₂-N(caprolactam) | H | NH₂ | greenish-tinged blue |
| 26 | -C₆H₁₁ (cyclohexyl) | -phenyl-OSO₃H | NH₂ | H | strongly greenish-tinged blue |
| 27 | -C₆H₁₀-OSO₃H (cyclohexyl-OSO₃H) | -CH₂-CH₂-CH₃ | H | NH₂ | blue |
| 28 | -CH(CH₃)₂ | -CH₂-CH₂-OSO₃H | NH₂ | H | blue |
| 29 | -CH₂-CH₂-phenyl-SO₃H | -phenyl(SO₃H)-NH-CO-CH₃ | H | NH₂ | strongly greenish-tinged blue |
| 30 | -CH₂-phenyl-SO₃H | -phenyl(SO₃H)-C(CH₃)₃ | NH₂ | H | greenish-tinged blue |

3,920,632

Table III-continued

| Serial No. | R | R₁ | Y | Y₁ | Colour shade |
|---|---|---|---|---|---|
| 31 | −CH(CH₃)−CH₂−CH₂−C₆H₄−SO₃H | C₆H₃(CH₃)−SO₂−NH−CH₂−CH₂−OSO₃H | H | NH₂ | greenish-tinged blue |
| 32 | −C₆H₄−CH₃ (SO₃H) | −C₆H₄−COOH | NH₂ | H | blue-green |
| 33 | −C₆H₄−CN | −C₆H₃(SO₃H)−O−CH₂−CH₂−OSO₃H | H | NH₂ | blue-green |
| 34 | −C₆H₄−COOC₂H₅ | −C₆H₃(CH₃)(SO₃H)₂ | NH₂ | H | blue-green |
| 35 | −CH₃ | −CH₂−CH₂−C₆H₄−SO₃H | H | NH₂ | blue |
| 36 | −CH₃ | −CH₂−CH₂−OSO₃H | H | NH₂ | blue |
| 37 | −CH₂−CH₂−CN | −C₆H₄−OSO₃H | NH₂ | H | strongly greenish-tinged blue |
| 38 | −CH₂−CH₂−OCH₃ | −CH₂−CH₂−OSO₃H | H | NH₂ | blue |
| 39 | −C₆H₁₀−CH₃ (cyclohexyl) | −C₆H₃(CH₃)(SO₃H)₂ | H | NH₂ | greenish-tinged blue |
| 40 | −CH(CH₂−OSO₃H)(CH₂−CH₃) | −C₆H₄−C₆H₄−SO₃H | NH₂ | H | greenish-tinged blue |
| 41 | −C₆H₃(SO₃H)(CH₃) | −CH(CH₂−CH₂−C₆H₄−SO₃H)(CH₂−CH(CH₃)−CH₃) | H | NH₂ | somewhat greenish-tinged blue |
| 42 | −CH(CH₃)₂ | [−C₆H₄−O−C₆H₄−]−(SO₃H)₂ | NH₂ | H | somewhat greenish-tinged blue |
| 43 | −CH₂−CH₂−OSO₃H | −C₅H₄N (pyridyl) | H | NH₂ | greenish-tinged blue |
| 44 | −C₆H₁₀−CH₃ (cyclohexyl) | −C₆H₃(SO₃H)−S−CH₂−CH₂−OSO₃H | H | NH₂ | greenish-tinged blue |
| 45 | −CH(CH₃)₂ | −C₆H₃(SO₃H)−NH₂ | NH₂ | H | greenish-tinged blue |
| 46 | −C₆H₁₁ (cyclohexyl) | −C₆H₂(NH₂)(SO₃H)₂ | NH₂ | H | blue |

Table III-continued

| Serial No. | R | R₁ | Y | Y₁ | Colour shade |
|---|---|---|---|---|---|
| 47 | —CH₂—CH(OSO₂H)—CH₃ | phenyl with NH₂ and —SO₃H | H | NH₂ | blue |
| 48 | —CH(CH₂—OSO₃H)(CH₂—CH₃) | phenyl with —CH₂—NH—CH₃ and SO₃H | H | NH₂ | blue |
| 49 | —CH₂—CH₂—NH₂ | phenyl with CH₃ and (SO₃H)₂ | H | NH₂ | blue |
| 50 | cyclohexyl—NH₂ | phenyl with —NH—CO—CH₃ and (SO₃H)₂ | NH₂ | H | blue |
| 51 | —CH(CH₃)(CH₃) | phenyl with OCH₃ and (SO₃H)₂ | H | NH₂ | greenish-tinged blue |

EXAMPLE 15 a. 5 g of 1-isopropylamino-4-p-toluidino-5-acetylaminoanthraquinone are stirred in a cold mixture of 27 ml of monohydrate and 20 ml of 20% strength oleum at 25° – 30° until no further starting material is detectable in a sample which is taken and chromatographed. After the customary working up, 7.2 g of the dyestuff of the formula

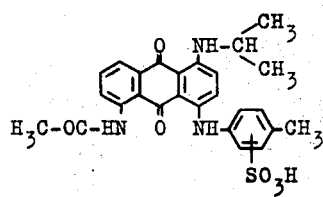

which dyes wool in a clear, strongly greenish-tinged blue shade, are obtained.

The final dyestuff can also be obtained by acetylation of the corresponding 5-amino dyestuff.

The starting product is obtained by reaction of 1-isopropylamino-4-bromo-5-acetylamino-anthraquinone with p-toluidine in the presence of potassium acetate and copper' chloride at 100° – 105° or by acetylation of the corresponding 5-amino compound.

EXAMPLE 16 a. 5 g of 1-isopropylamino-4-m-toluidino-8-benzoylaminoanthraquinone are dissolved in 25 ml of anhydrous sulphuric acid at below 30° and 15 ml of 20% strength oleum are progressively added. After the usual working up, 7.1 g of the dyestuff of the formula

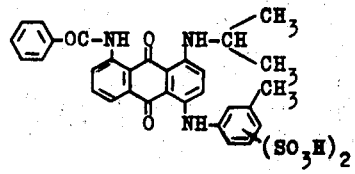

which dyes polyamide fibres in a fast clear green-blue shade, are obtained.

The starting product is obtained by acylation of 1-isopropylamino-4-m-toluidino-8-amino-anthraquinone - obtained according to Example 10b - with benzoyl chloride in pyridine at 25°.

EXAMPLE 17 a. 3 g of the dyestuff of the formula

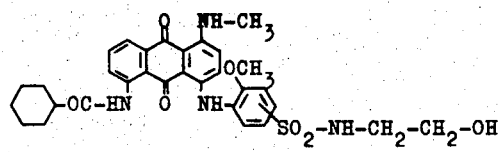

are dissolved in 15 ml of monohydrate at 20° and the mixture is stirred for a further 30 minutes. After the customary working up, 4.1 g of the sulphuric acid half-ester, which dyes polyamide fibres in a green-blue shade, are obtained.

The starting compound is obtained by reaction of 1-methylamino-4-bromo-5-cyclohexylcarbonylamino-anthraquinone with o-anisidine in the presence of potassium acetate and copper' chloride at 120°–125°, subsequent reaction with chlorosulphonic acid at below 10°, thereafter reaction with thionyl chloride at 60° – 70°, and finally reaction of the reaction product with ethanolamine at 55°–60°.

EXAMPLE 18

2.6 g of 1-cyclohexylamino-4-m-anisidino-8-amino-anthraquinone-disulphonic acid (Dyestuff Table III, No. 3) are dissolved in 60 ml of water at 20° – 25° and 1 ml of chloroformic acid methyl ester is added dropwise over the course of 30 minutes, whilst keeping the pH value at 5 – 6 by means of 1 N sodium carbonate solution. The mixture is further stirred at pH 5 – 6 until, according to a chromatogram, only traces of starting material are still present. 8 g of sodium chloride are now added in portions and the product is filtered off, washed with 10% strength sodium chloride solution and dried in vacuo at 60°. 2.7 g of the dyestuff of the formula

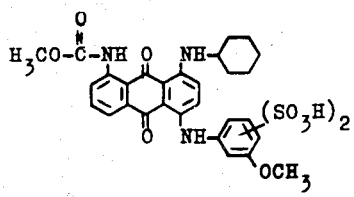

which dyes polyamide fibres in a strongly greenish-tinged blue shade, are obtained.

EXAMPLE 19

5 g of 1-isobutylamino-4-(m-acetamino-anilino)-8-phenylamino-carbonylamino-anthraquinone are dissolved in 25 ml of monohydrate, 7 ml of 20% strength oleum are added below 25° and the mixture is further stirred until an initially arising monosulphonation product has disappeared (approx. 3 hours). After the customary working up, 6.1 g of the dyestuff of the formula

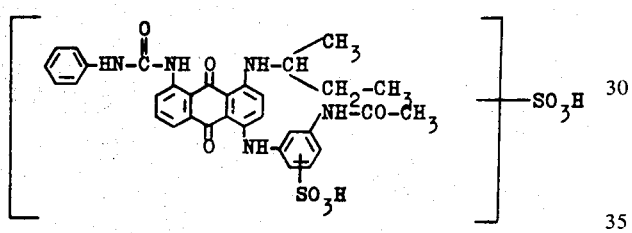

which dyes polyamide fibres in a greenish-tinged blue shade, are obtained.

It is not exactly known in which of the external phenyl radicals the second sulphonic acid group is located.

The starting product is obtained by reaction of 1-isobutylamino-8-(phenylamino-carbonylamino)-4-bromo-anthraquinone with m-phenylenediamine in o-dichlorobenzene in the presence of potassium acetate and copper' chloride at 100° – 105°, and sub sequent acylation with acetic anhydride in pyridine at 25°–30°.

EXAMPLE 20

4.7 g of 4-nitrobenzoyl chloride are added, at 20°–25°, to a solution of 11.8 g of 1-isopropylamino-4-m-toluidino-8-amino-anthraquinone-disulphonic acid obtained according to Example 10 a), whilst keeping the pH value of the reaction mixture at 5.5–6 by means of 1 N sodium hydroxide solution. The reaction is complete after about 3 hours. 20 g of sodium chloride are added in portions and the product is filtered off, washed with 5% sodium chloride solution and dried in vacuo at 60°. 14 g of the dyestuff of the formula

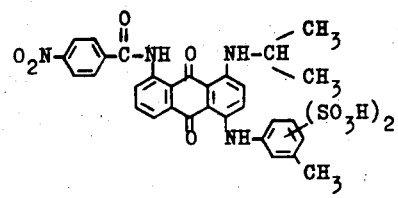

which dyes polyamide fibres in strongly greenish-tinged blue shades, are obtained.

Reduction with sodium sulphide yields 1-isopropylamino-4-m-toluidino-8-(p-aminophenyl-carbonylamino)-anthraquinone-disulphonic acid, which dyes polyamide fibres in a greenish-tinged blue shade.

EXAMPLE 21

12.1 g of 1-isopropylamino-4-m-anisidino-8-amino-anthraquinone-disulphonic acid (= Dyestuff Table III, No. 4) are dissolved in 300 ml of water at 20° – 25° and 5.6 g of 3-nitrobenzenesulphochloride are added over the course of 15 minutes. The pH value of the reaction mixture is kept at 5.5–6 by dropwise addition of 1 N sodium hydroxide solution. When no further starting material is detectable (reaction time approx. 5 hours), the product is salted out with 60 g of sodium chloride, filtered off, washed with 13% strength sodium chloride solution and dried in vacuo at 60°. 20 g of the dyestuff of the formula

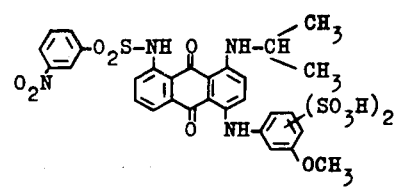

which dyes wool in a greenish-tinged blue colour shade, are obtained.

Reduction of this dyestuff with sodium sulphide yields 1-isopropylamino-4-m-anisidino-8-(m-aminophenyl-sulphonylamino)-anthraquinone-disulphonic acid.

EXAMPLE 22 a. 4 g of 1-isopropylamino-4-p-toluidino-8-phenoxyacetylamino-anthraquinone are sulphonated at 20°–25° in a mixture of 20 ml of monohydrate and 10 ml of 20% strength oleum until chromatographically neither dyestuff base nor monosulphonic acid are detectable. After the customary working up, 3.6 of the dyestuff of the formula

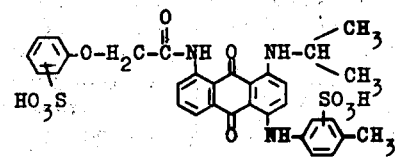

which dyes polyamide in a clear, strongly greenish-tinged blue shade, are obtained.

b. If the procedure indicated above is followed but the addition of oleum is dispensed with, 4.2 g of a monosulphonic acid in which probably only the phenyl nucleus of the phenoxyacetylamino group has been sulphonated, are obtained. This product dyes polyamide in clear, strongly greenish-tinged blue shades.

c. The starting meterial used under a) is manufactured by reaction of 1-isopropylamino-4-p-toluidino-8-amino-anthraquinone with phenoxyacetic acid chloride in pyridine at 90°– 100°.

EXAMPLE 23

5 g of 1-α-phenylethylamino-4-p-toluidino-5-acetylaminoanthraquinone are dissolved in 35 ml of anhydrous sulphuric acid and a total of 30 ml of 20% strength oleum is progressively added at room temperature. The mixture is further stirred until a monosulphonation product initially produced has disappeared. After the customary working up, 9.1 g of the dyestuff of the formula

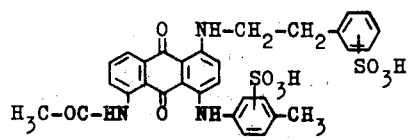

are obtained. The dyestuff dyes polyamide fibres in greenblue shaded.

The starting product is obtained by reaction of 1-β-phenylethylamino-4-chloro-5-acetylamino-anthraquinone with p-toluidine in the presence of potassium acetate and copper/chloride/iodine at 140°–145°.

EXAMPLE 24 a. 3 g of 1-isopropylamino-4-m-toluidino-8-amino-anthraquinone-disulphonic acid, obtained according to Example 20, are dissolved in 80 ml of water at 20° and 1.2 g of p-toluenesulphonyl chloride are added at 50°. The pH value of the reaction mixture is kept at 5.5 – 6 by dropwise addition of 1 N sodium hydroxide solution. When chromatographically only traces of starting material remain detectable, 8 g of sodium chloride is added in portions at pH 6 – 7 and 20° and the mixture is stirred for a further 12 hours at the same temperature. After filtration, the product is washed with 10% strength sodium chloride solution and dried in vacuo at 60°. 3.3 g of the dyestuff of the formula

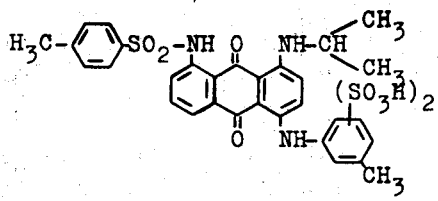

which dyes polyamide fibres in greenish-tinged blue shades, are obtained.

b. If instead of p-toluenesulphonyl chloride 2 g of methanesulphochloride are employed and in other respects the procedure indicated above is followed, 2.8 g of 1-isopropylamino-4-m-toluidino-8-methylsulphonylamino-anthraquinone-disulphonic acid are obtained, which dyespolyamide fibres similarly to the dyestuff obtained in a.

Using one or more of the procedures described in Examples 15 – 24 and employing appropriate starting compounds, the dyestuffs of the formula

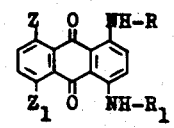

listed in Table IV are obtained, which dye polyamide in the colour shades indicated.

Table IV

| Serial No. | R | $R_1$ | Z |
|---|---|---|---|
| 1 | —CH(CH₃)₂ | —C₆H₃(CH₃)(SO₃H)₂ | NH—CO—CH₃ |
| 2 | " | —C₆H₃(OCH₃)(SO₃H) | NH—CO—CH₃ |
| 3 | " | —C₆H₃(N(CH₃)—CO—CH₃)(SO₃H) | —NH—CO—CH(Cl)₂ |
| 4 | " | —C₆H₃(O—CH₂—CH₂—OSO₃H)(SO₃H) | NHC(=O)—CH₂—CH(CH₃)₂ |
| 5 | —C₆H₅ | —C₆H₃(NH—CO—CH₃)(SO₃H)₂ | —H |
| 6 | —CH(CH₃)(CH₂—CH₃) | —C₆H₃(SO₃H)(O—CH₂—CH₂—OSO₃H) | —NH—CO—CH₂—OC₂H₅ |

Table IV – Continued

| Serial No. | R | R₁ | Z |
|---|---|---|---|
| 7 | $-CH(CH_3)_2$ | -C₆H₄(SO₃H)-OC₂H₅ | H |
| 8 | $-CH(CH_2-OSO_3H)(CH_2-CH_3)$ | -C₆H₁₀(SO₃H)- (cyclohexyl with SO₃H) | $-NH-CO-C(CH_3)=CH_2$ |
| 9 | $-CH(CH_2-CH_3)_2$ | -C₆H₃(NH-CO-CH₃)(SO₃H)₂ | $-NH-CO-CH_2-CH_3$ |
| 10 | $-CH_2-CH_2-OSO_3H$ | -C₆H₃(NH-CO-CH₂-CH₃)(SO₃H) | $-NH-CO-C_6H_4-C(CH_3)_2-CH_3$ |
| 11 | $-CH_3$ | -C₆H₄-SO₃H | $-NH-SO_2-CH_3$ |
| 12 | $-CH_3$ | -C₆H₄-OSO₃H | H |
| 13 | $-CH(CH_3)_2$ | -C₆H₂(CH_3)_2(SO_3H)(CH_3) | $NH-CO-CH_3$ |
| 14 | " | $-CH_2-CH_2-C_6H_4-SO_3H$ | $-NH-CO-CH_2-OSO_3H$ |
| 15 | -C₆H₁₀-OSO₃H (cyclohexyl) | $-CH(CH_3)-CH_2-C(CH_3)_2-C_6H_4-SO_3H$ | H |
| 16 | -C₆H₁₀(NH₂)- (aminocyclohexyl) | -C₆H₃(CH_3)(SO_3H)_2 | $-NH-CO-C_6H_{11}$ |
| 17 | $-CH_2-CH_2-C_6H_4-SO_3H$ | -C₆H₄(CH_3)(SO_2-NH-CH_3) | $-NH-CO-C_6H_5$ |
| 18 | $-CH(CH_2-CH_2-C_6H_4-SO_3H)(CH_2-CH(CH_3)-CH_3)$ | -C₆H₃(NH-CO-CH₃)(SO₃H)₂ | $-NH-CO-C_6H_4-NO_2$ |
| 19 | $-CH_2-CH_2-C_6H_4-SO_3H$ | -C₆H₃(C(CH_3)_3)(SO_3H) | $-NH-CO-CH_2-Br$ |
| 20 | -C₆H₃(SO₃H)(O-CH₂-CH₂-OH) | -C₆H₃(CH_3)(SO_3H) | H |
| 21 | $-CH_2-CH_2-CH_2-OSO_3H$ | -C₆H₃(Br)(SO₃H) | H |
| 22 | $-CH(CH_3)_2$ | -C₆H₄-OSO₃H | $-NH-CO-CH_2-CH_2-Br$ |
| 23 | $-CH(CH_3)-CH_2-C_6H_4-SO_3H$ | -C₆H₃(OCH_3)(SO_3H) | $-NH-CO-CH_2-CH(CH_3)-CH_3$ |
| 24 | $-CH(CH_2-OSO_3H)(CH_2-CH_3)$ | -C₆H₃(CH_3)(SO_3H)_2 | H |

Table IV – Continued

| Serial No. | R | R₁ | Z |
|---|---|---|---|
| 25 | 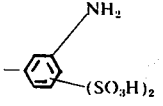 cyclohexyl |  phenyl-NH₂, (SO₃H)₂ | NH—CO—CH=CH₂ / CH₃ |
| 26 | —CH₂—CH₂——SO₃H | —CH—CH₂—CH₂——SO₃H / CH₃ | H |
| 27 | " | ——S—CH₂—CH₂—OH / SO₃H | —NH—CO—CH₂—CH₂ / H₃COOC |
| 28 | " | —NH—CH₂—CH₂—OSO₃H | H |
| 29 | " | —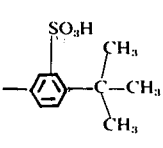—NH—CO—CH₃ / SO₃H | —NH—C—OC₂H₅ ‖ O |
| 30 | " | " | H |
| 31 | —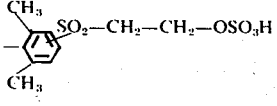—OSO₃H | ——C(CH₃)₃ / SO₃H | —NH—C—NH—CH₃ ‖ O |
| 32 | —CH₂—CH—CH₃ / OSO₃H | " | H |
| 33 | —CH₂—CH₂—OSO₃H | —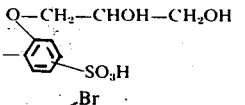—SO₂—CH₂—CH₂—OSO₃H (2,6-di-CH₃) | —NH—C—NH—C₃H₇ ‖ O |
| 34 | —CH₂—CH₂—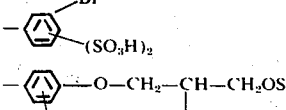—SO₃H | —O—CH₂—CHOH—CH₂OH / —SO₃H | —NH—C—NH—CH₂—CH=CH₂ ‖ O |
| 35 | —CH(CH₃)₂ | —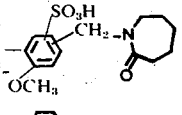—Br, (SO₃H)₂ | H |
| 36 | " | —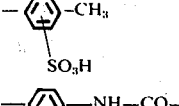—O—CH₂—CH(OH)—CH₂OSO₃H / SO₃H | —C—CH₂—CH₂—NH—CH₃ ‖ O |
| 37 | —CH₂—CH₂—OH |  (SO₃H, CH₂-N-caprolactam, OCH₃) | H |
| 38 | —CH(CH₃)₂ | ——CH₃ / SO₃H | H |
| 39 | " | ——NH—CO—CH₂—OSO₃H / SO₃H | —SO₂—CH₂—CH₂ / NH—CH₃ |
| 40 | " | ——NH—CO—CH₂—OSO₃H | H |
| 41 | " | ——CH₃, (SO₃H)₂ | —CO—CH₂—S— |
| 42 | —CH₂—CH₂—OSO₃H | —CH₂—CH₂——SO₃H | H |
| 43 | " | " | —CO—CH₂——CH₃ |
| 44 | ——CH₃ / SO₃H | —CH₂—CH₂—OSO₃H | H |
| 45 |  (OCH₃, (SO₃H)₂) | —CH₃ | —CO—CH=CH₂ / -NO₂ |

Table IV—Continued

| Serial No. | R | R₁ | Z |
|---|---|---|---|
| 46 | '' | —CH₂—CH₂—C₆H₄—SO₃H | H |
| 47 | —CH(CH₃)₂ | —C₆H₃(OH)(SO₃H)₂ | —CO—C₆H₄—COOC₂H₅ |
| 48 | —CH(CH₂—CH₃)₂ | —C₆H₃(O—C₂H₅)(SO₃H)₂ | H |
| 49 | —CH(CH₃)₂ | —C₆H₃(O—CH₂—CH₂—OSO₃H)(SO₃H) | —CO—C₆H₄—CF₃ |
| 50 | —C₆H₁₁ (cyclohexyl) | —C₆H₃(NH—CO—CH₃)(SO₃H)₂ | H |
| 51 | —CH₂—CH₂—O—CO—CH₃ | —C₆H₃(O—CH₂—CH₂—OSO₃H)(SO₃H) | —CO—C₆H₄—OCH₃ |
| 52 | —CH—CH₂—C(CH₃)₂—C₆H₄—SO₃H (with CH₃ branch) | —CH₂—CH₂—C₆H₄—SO₃H | —CO—C₆H₃(Cl)(SC₂H₅) |
| 53 | —CH(CH₃)₂ | —C₆H₃(CH₃)(SO₃H)₂ | H |
| 54 | —CH₂—CH₂—C₆H₄—SO₃H | —C₆H₃(CH₃)(SO₃H) | —CO—C₆H₃(OC₂H₅)(S—CH₂—CH₂—OSO₃H) |
| 55 | '' | '' | H |
| 56 | —CH₂—CH₂—C₆H₄—SO₃H | —C₆H₃(OCH₃)(SO₃H)₂ | —CO—C₆H₃(CO—)(CH₃) |
| 57 | '' | —C₆H₃(OCH₃)(SO₃H) | —SO₂—C₆H₄—Cl |
| 58 | H | —C₆H₃(CH₃)(SO₃H)₂ | H |
| 59 | —CH₂—CH₂—OSO₃H | '' | —CO—C₁₀H₅(OH) (hydroxynaphthyl) |

Table IV – Continued

| Serial No. | R | $R_1$ | Z |
|---|---|---|---|
| 60 | " | ―⟨⟩―$CH_3$ with $SO_3H$ | ―$SO_2$―⟨⟩ with $CH_3$, Br |
| 61 | ―CH(CH$_3$)$_2$ | ―⟨⟩―$CH_3$ with $(SO_3H)_2$ | H |
| 62 | ―CH(CH$_2$―OSO$_3$H)(CH$_2$―CH$_3$) | " | ―$SO_2$―⟨⟩―OH |
| 63 | ―CH$_2$―CH$_2$―⟨⟩―$SO_3H$ | ―⟨⟩―$CH_3$ with $(SO_3H)_2$ | H |
| 64 | " | " | ―$SO_2$―⟨⟩―⟨⟩ |
| 65 | " | " | H |
| 66 | " | ―⟨⟩―$CH_3$ with $SO_3H$ | ―NH―C(=S)―NH―⟨⟩―$SO_3H$ |
| 67 | ―CH(CH$_3$)$_2$ | ―⟨⟩―$OCH_3$ with $(SO_3H)_2$ | H |
| 68 | " | " | NH―C(=O)―NH―⟨⟩―$NO_2$ |
| 69 | ―⟨cyclohexyl⟩ | ―⟨⟩―$CH_3$ with $SO_3H$ | H |

| Serial No. | $Z_1$ | Colour shade |
|---|---|---|
| 1 | H | greenish-tinged blue |
| 2 | H | strongly greenish-tinged blue |
| 3 | H | greenish-tinged blue |
| 4 | H | " |
| 5 | ―NH―CO―CH$_2$―O―⟨⟩ | " |
| 6 | H | greenish-tinged blue |
| 7 | ―NH―CO―CH$_2$―O―⟨⟩―$SO_3H$ | strongly greenish-tinged blue |
| 8 | H | strongly greenish-tinged blue |
| 9 | H | greenish-tinged blue |
| 10 | H | blue-green |
| 11 | H | blue |
| 12 | ―NH―SO$_2$―CH$_3$ | greenish-tinged blue |
| 13 | H | clear blue |
| 14 | H | " |

Table IV – Continued

| Serial No. | $Z_1$ | Colour shade |
|---|---|---|
| 15 | NH—SO$_2$—C$_6$H$_4$—CH$_3$ | " |
| 16 | H | somewhat greenish-tinged blue |
| 17 | H | strongly greenish-tinged blue |
| 18 | H | strongly greenish-tinged blue |
| 19 | H | greenish-tinged blue |
| 20 | NH—CO—CH$_2$—CH$_2$—CH$_3$ | blue-green |
| 21 | —NH—CO—CH(—(CH$_2$)$_3$—CH$_3$)—CH$_2$—CH$_3$ | greenish-tinged blue |
| 22 | H | " |
| 23 | H | " |
| 24 | —NH—CO—(CH$_2$)$_{16}$CH$_3$ | blue |
| 25 | H | " |
| 26 | —NH—CO—CH$_2$—CN | " |
| 27 | H | greenish-tinged blue |
| 28 | —NH—C(=O)—N(CH$_3$)—CH$_3$ | blue |
| 29 | H | greenish-tinged blue |
| 30 | —NH—C(=O)—CH$_2$—C(=O)—CH$_3$ | " |
| 31 | H | blue |
| 32 | —NH—C(=S)—NH—CH$_3$ | " |
| 33 | H | " |
| 34 | H | " |
| 35 | —NH—C(=S)—NH—CH$_2$—CH=CH$_2$ | " |
| 36 | H | greenish-tinged blue |
| 37 | —CO—CH$_2$Cl | greenish-tinged blue |
| 38 | —SO$_2$—CH$_3$ | somewhat greenish-tinged blue |
| 39 | H | greenish-tinged blue |
| 40 | —SO$_2$—CH$_2$—CH$_2$—OSO$_3$H | greenish-tinged blue |
| 41 | H | greenish-tinged blue |
| 42 | —CO—C$_6$H$_5$ | blue |
| 43 | H | blue |
| 44 | —CO—CH=CH—C$_6$H$_5$ | somewhat greenish-tinged blue |
| 45 | H | somewhat greenish-tinged blue |
| 46 | —CO—C$_6$H$_4$—C$_6$H$_4$—NO$_2$ | strongly greenish-tinged blue |
| 47 | H | strongly greenish-tinged blue |

Table IV – Continued

| Serial No. | $Z_1$ | Colour shade |
|---|---|---|
| 48 | —CO—C$_6$H$_4$—NO$_2$ | strongly greenish-tinged blue |
| 49 | H | strongly greenish-tinged blue |
| 50 | —CO—C$_6$H$_4$—O—COCH$_3$ | strongly greenish-tinged blue |
| 51 | H | strongly greenish-tinged blue |
| 52 | H | blue |
| 53 | —CO—C$_6$H$_3$(NO$_2$)—OCH$_3$ | greenish-tinged blue |
| 54 | H | greenish-tinged blue |
| 55 | —CO—CH$_2$—CO—C$_6$H$_5$ | greenish-tinged blue |
| 56 | H | greenish-tinged blue |
| 57 | H | blue |
| 58 | —CO—C$_{10}$H$_6$—SO$_3$H | greenish-tinged blue |
| 59 | H | greenish-tinged blue |
| 60 | H | blue |
| 61 | —SO$_2$—CH$_2$—C$_6$H$_5$ | blue |
| 62 | H | blue |
| 63 | —SO$_2$—C$_6$H$_3$(OCH$_3$)(NO$_2$) | blue |
| 64 | H | blue |
| 65 | —SO$_2$—C$_6$H$_4$—COOCH$_3$ | blue |
| 66 | H | blue |
| 67 | —CO—CH$_2$—NH—C$_6$H$_4$—SO$_3$H | greenish-tinged blue |
| 68 | H | blue |
| 69 | —NH—CO—NH—C$_6$H$_3$(CH$_3$)(SO$_3$H) | blue |

EXAMPLE 25 a. 5 g of the dyestuff of the formula

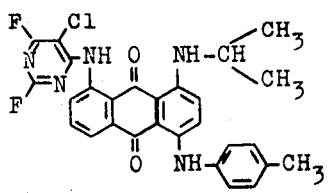

are dissolved in a mixture of 10 ml of 20% strength oleum and 5 ml of concentrated sulphuric acid at room temperature. When chromatographically no further starting material is detectable, the mixture is stirred into 120 g of ice water and filtered and the residue is again suspended in 100 ml of 1% strength sodium chloride solution. Thereafter the product is filtered off, washed with 1% strength sodium chloride solution until neutral and dried in vacuo at 50°. Yield: 5 g; NaCl content: 0.6%. The resulting dyestuff is the sodium salt of a derivative of the above formula which is monosulphonated in the toluidine radical. Further sulpho groups cannot be introduced through sulphonation in more highly concentrated oleum. The dyestuff dyes wool and polyamide, in accordance with customary dyeing processes, in bluish-tinged green shades. The dyeings show good fastness to light.

b. The compound employed in a can be obtained as follows:

5.4 ml of triethylamine are added dropwise over the course of 15 hours, at 75°–80°, to a mixture of 11.55 g of 1-isopropylamino-4-p-toluidino-8-amino-anthraquinone (= dyestuff base of Dyestuff No. 12. Table III), 60 ml of nitrobenzene and 3.85 ml of 2,4,6-trifluoro-5-chloro-pyrimidine and the mixture is kept at 75°–80° until chromatographically only traces of starting material remain detectable (duration approx. 2 hours).

After adding 60 ml of methanol at 60°–70°, the product is filtered off cold and is rinsed with 60 ml of methanol-nitrobenzene (1 : 1) and subsequently with methanol until free of nitrobenzene. 12 g of pure product are obtained.

c. Dyeing instruction for wool 5 g of wool yarn are introduced at room temperature into 200 ml of a liquor which contains 50 ml of an 0.2% strength solution of the dyestuff obtained according to a) and, relative to the weight of the goods, 5% of anhydrous sodium sulphate, 6% of 30% strength acetic acid and 1% of a customary levelling auxiliary, the liquor is heated to 70° over the course of 10 minutes and kept for 30 minutes at this temperature, raised to the boil in 10 minutes and kept for 1 hour at the boil. It is allowed to cool and the yarn is well rinsed with cold water, centrifuged and dried at 70°– 80°. A strong and clear bluish-tinged green dyeing of good fastness to light is obtained. Polyamide is dyed as indicated for wool but without the addition of sodium sulphate and of a customary levelling auxiliary.

EXAMPLE 26 a. 10 g of 1-isopropylamino-4-m-anisidino-5-(difluorochloro-pyrimidyl-amino)-anthraquinone are dissolved in a mixture of 20 ml of 20% strength oleum and 10 ml of concentrated sulphuric acid at 20°– 28° and the mixture is stirred at the same temperature until neither dyestuff base nor monosulphonated product are chromatographically detectable.

Thereafter it is stirred into concentrated sodium chloride solution in the cold, the pH value is adjusted to 6 – 7 with concentrated sodium hydroxide solution and the product is filtered off, washed with 5% strength sodium chloride solution until free of sulphate and dried in vacuo at 60°. 14.5 g of the dyestuff of the formula

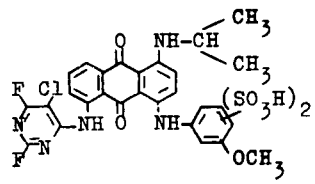

which on cotton yields a strongly bluish-tinged green dyeing with very good fastness properties, are obtained.

b. The starting compound is obtained by reaction of 1-isopropylamino-4-m-anisidino-5-amino-anthraquinone (= dyestuff base of Dyestuff No. 51, Table III) in nitrobenzene with 2,4,6-trifluoro-5-chloro-pyrimidine at 70°– 80° in the presence of triethylamine.

EXAMPLE 27 a. 5 g of 1-methylamino-4-[0-($\beta$-hydroxyethoxy)-anilino]-8-(difluoro-chloro-pyrimidylamino)-anthraquinone are introduced into 50 ml of anhydrous sulphuric acid at room temperature and the mixture is stirred at room temperature until, according to the chromatogram, no further starting material is present. After stirring the mixture into ice water, the product is filtered off, washed until neutral and dried in vacuo at 50°–60°. 4.5 g of a product which essentially corresponds to the formula

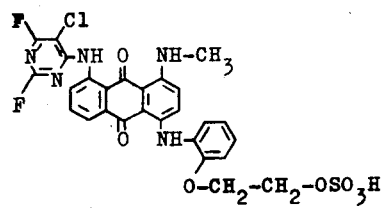

are obtained.

b. If, in the above example, monohydrate is replaced by 5–10% oleum but the mixture is worked up in sodium chloride solution instead of in water, a product is obtained in good yield which is not entirely a single substanct but essentially corresponds to the formula

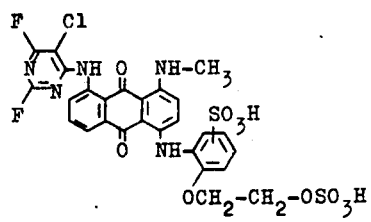

On wool and polyamide, both dyestuffs yield a strongly bluishtinged green dyeing.

c. The starting product is obtained by reaction of 1-methylamino-

4-[0-(β-hydroxyethoxy)-anilino]-8-aminoanthraquinone (= dyestuff base of Dyestuff No. 14, Table III) with 2,4,6-trifluoro-5-chloropyrimidine in nitrobenzene at 75°–80° in the presence of triethylamine.

EXAMPLE 28 a. 2.5 g of 1-methylamino-4-m-toluidino-5-(trichloropyrimidyl-amino)-anthraquinone are introduced over the course of 15 minutes into 12.5 ml of monohydrate at 15°–20° and when all the material has dissolved 3 ml of 20% strength oleum are added dropwise at 20°–25°. The mixture is further stirred at room temperature until chromatographically neither dyestuff base nor monosulphonated product are detectable. After the customary working up, 3.5 g of a dyestuff of the formula

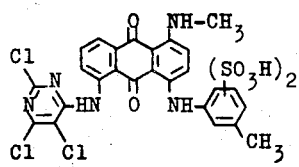

which dyes polyamide fibres and cotton in blue-green shades, are obtained.

The dyestuff is also obtained by reaction of 1-methylamino-4-m-toluidino-5-aminoanthraquinone-disulphonic acid with tetrachloropyrimidine in an aqueous medium at 80°–85°C and pH 5.5 – 7.

b. The starting product is obtained by reaction of 1-methylamino-4-m-toluidino-5-amino-anthraquinone (= dyestuff base of the Dyestuff No. 13, Table III) with 2,4,5,6-tetrachloropyrimidine in nitrobenzene at 95°–100° in the presence of triethylamine.

EXAMPLE 29 a. A solution of 8.9 g of 1-isopropylamino-4-m-toluidino-8-amino-anthraquinone-disulphonic acid, obtained according to Example 10 a), in 245 ml of water is added dropwise over the course of 30 minutes of 0°–5°, to a suspension of cyanuric chloride which has been prepared by dropwise addition of a solution of 4.15 g of cyanuric chloride in 40 ml of acetone to 100 ml of the ice water. The acid which is produced by reaction of the anthraquinone component with cyanuric chloride is continuously neutralised with 1 N sodium carbonate solution so that a pH value of 4–5 is maintained in the reaction mixture. Thereafter the mixture is stirred for a further 2 hours at pH 4–5 and 0°–5°, until starting material is no longer detectable by thin layer chromatography. The dyestuff suspension is buffered by adding a solution of 3.5 g of primary sodium phosphate (NaH$_2$PO$_4$ . 2 H$_2$O) and 1.7 g of secondary sodium phosphate (Na$_2$HPO$_4$) in 25 ml of water. After filtration, and washing with 1% strength sodium chloride solution, the product is dried in vacuo at 20° – 25°. To remove excess cyanuric chloride, the dry dyestuff is extracted with acetone. 9 g of the dyestuff of the formula

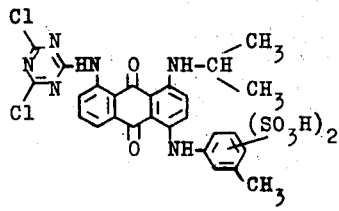

which dyes cotton in a strongly greenish-tinged blue shade, are obtained.

b. Entirely analogously, 2,4-dichloro-6-methoxy-triazine-1,3,5 and disulphonated 1-cyclohexylamino-4-m-anisidino-5-aminoanthraquinone yield the dyestuff of the formula

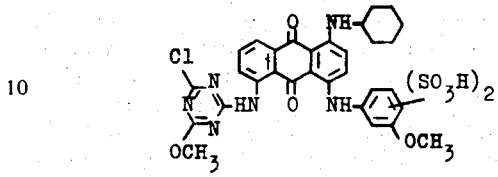

which dyes polyamide fibres and cotton in clear blue-green shades.

EXAMPLE 30 a. 6.4 g of 1-(β-sulphatoethylamino)-4-(p-acetylaminoanilino)-5-aminoanthraquinone-monosulphonic acid (= dyestuff Example No. 11, Table III) are dissolved in 120 ml of water at 55° and at the same temperature 3.5 g of 2,3-dichloroquinoxaline-6-carboxylic acid chloride and 1 ml of chlorobenzene are added. The pH value of the reaction mixture is kept at 5.5 – 6.5 with 1 N sodium hydroxide solution. When starting material is no longer detectable chromatographically, the mixture is worked up in the usual manner. 6.7 g of dyestuff of the formula

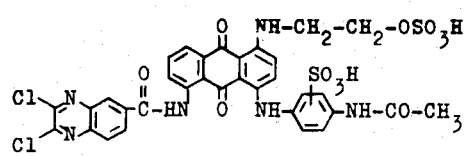

which dyes wool and polyamide, as well as cotton, in clear green shades, are obtained.

b. If, in a) the 2,3-dichloro-quinoxaline-6-carboxylic acid chloride is replaced by 6 of dichloro-quinoxaline-6-sulphonyl chloride and the reaction is carried out at pH 6 – 7, 8.8 g of a dyestuff which produces a dyeing of a distinctly bluer shade are obtained.

EXAMPLE 31 a. 4.5 g of 1-(β-sulphato-ethylamino)-4-β-phenylethylamino-5-amino-anthraquinone-monosulphonic acid (= dyestuff No. 10, Table III) are dissolved in 97 ml of water at 55° and at the same temperature 4.5 g of 2,3-dichloro-quinoxaline-6-sulphonic acid chloride and 1 ml of chlorobenzene are added. The pH value of the reaction mixture is kept at 6–7 by means of 1 N sodium hydroxide solution. As soon as the reaction is complete (after approx. 5 hours) the chlorobenzene is driven off, 12 g of sodium chloride are added, and the product is filtered off, washed with 10% strength sodium chloride solution and dried in vacuo at 40°. To remove the excess dichloroquinoxaline-sulphochloride, the dyestuff is extracted with acetone. 6.5 g of dyestuff of the formula

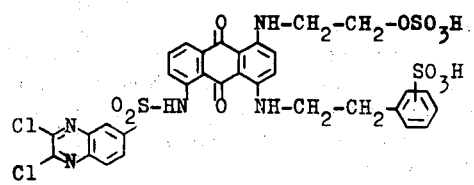

which dyes wool, cotton and polyamide in clear blue shades, are obtained.

b. Dyeing instruction for cotton 3 g of dyestuff are worked into a paste with 3 ml of water at 20°–25° and are subsequently dissolved by means of 67 ml of water at 20°. 30 g of a 10% strength sodium carbonate solution are added to this solution and this liquor is used to pad 20 g of cotton cloth or staple fibre in such a way that the cloth or the fibre takes up about 80%, of its dry weight, of liquor. The dyed material is rolled up and stored for 24 hours at 25° in such a way that no moisture can escape. The dyed material is now washed with water, soaped with an 0.1% strength sodium alkylsulphonate solution at the boil and dried.

c. If, in the above example, 2,3-dichloro-quinoxaline-6-sulphonic acid chloride is replaced by 2,3-dichloro-quinoxaline-6-carboxylic acid chloride and the pH value during the reaction is kept at 5.5 – 6.5, but in other respects the procedure indicated is followed, a dyestuff with a noticeably more greenish-tinged shade is obtained.

EXAMPLE 32 a. 6.1 g of the Na salt of the dyestuff of the formula (= dyestuff No. 15, Table III)

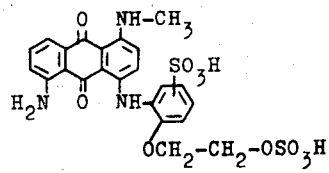

are dissolved in 190 ml of water. 5 g of α, β-dibromopropionic acid chloride are now dripped into this solution over the course of 30 minutes at 0° – 10°. The pH value of the reaction mixture is kept at 5-6 by adding 1 N sodium bicarbonate solution. The mixture is further stirred at 0° – 10° until starting material is no longer detectable chromatographically. The dyestuff is precipitated at 20°–25° by adding 50 g of sodium chloride in portions and is filtered off, washed with 20% strength sodium chloride solution and dried in vacuo. In the acid form, the dyestuff has the formula

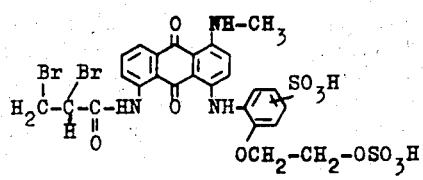

and dyes polyamide fibres, above all synthetic polyamide fibres, in a clear, strongly bluish-green shade.

b. A similar dyestuff can be obtained if instead of the α, β-dibromopropionic acid chloride α-bromoacrylic acid chloride is employed.

EXAMPLE 33

3.55 g of 1-isopropylamino-4-m-toluidino-8-[(p-aminophenyl)-carbonylamino]-anthraquinone-disulphonic acid - obtained analogously to Example 20 - are acylated at 55°, in 75 ml of water, with 2.5 g of 2,3-dichloro-quinoxaline-6-sulphonic acid chloride (in 0.5 ml of chlorobenzene) at a pH of 6–7. After the customary working up, 5 g of the dyestuff of the formula

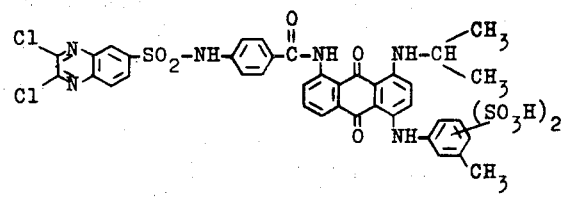

which dyes polyamide, in accordance with the instruction of Example 25 c), in a clear, strongly greenish-tinged blue light-fast shade, are obtained.

EXAMPLE 34

5 g of 1-methylamino-4-[(m-difluoro-chloro-pyrimidylamino)-anilino]-5-isopropylamino-anthraquinone are introduced over the course of 30 minutes into a mixture of 5 ml of concentrated sulphuric acid and 10 ml of 20% strength oleum, at 10° – 15°. When the dyestuff base has dissolved, it is further stirred at 20° – 25° until, according to a chromatogram, neither starting material nor monosulphonated dyestuff base are detectable (approx. 1½ hours). After the customary working up, 7.5 g of the dyestuff of the formula

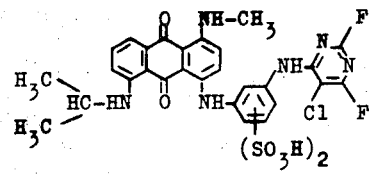

which dyes wool, polyamide and cotton in somewhat greenish-tinged blue shades, are obtained.

The starting product is obtained by acylation of 1-methyl-amino-4-(m-amino-anilino)-5-isopropylamino-anthraquinone (= dyestuff base of the dyestuff Example 11, Table II) with 5-chloro-2,4,6-trifluoro-pyrimidine in nitrobenzene at 70° – 80° in the presence of triethylamine.

EXAMPLE 35

2.6 g of 1-cyclohexylamino-4-m-anisidino-5-amino-anthraquinone-disulphonic acid (= dyestuff of Table III, No. 3) are dissolved in 60 ml of water at 20°–25° and 1.5 g of chloroformic acid phenyl ester are added dropwise over the course of 30 minutes whilst keeping the pH value at 5–6 by means of 1 N sodium carbonate solution. The mixture is further stirred at pH 5–6 until only traces of starting material remain detectable chromatographically. Thereafter, the product is filtered off, washed with 1% strength sodium chloride solution and dried in vacuo at 60°. 3.1 g of the dyestuff of the formula

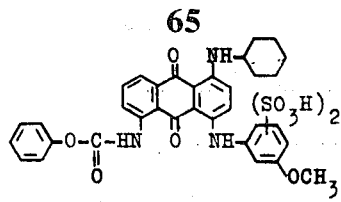

which dyes polyamide fibres in a strongly greenish-tinged blue shade, are obtained.

EXAMPLE 36

2.3 g of 1-isopropylamino-4-m-anisidino-8-[(3'-aminophenyl)-sulphonylamino]-anthraquinone-disulphonic acid (see Example 21) are dissolved in 50 ml of water at 55°. 2 g of 2-methylsulphonyl-4,5-dichloro-6-methyl-pyrimidine are then added at the same temperature and at pH 5.5–6 and the pH value is kept at 5.5 – 6 by dropwise addition of 1 N sodium carbonate solution. When starting material is no longer detectable, the dyestuff solution is filtered and thereafter the dyestuff is salted out with 10 g of sodium chloride. After filtration and washing with 10% strength sodium chloride solution, the product is dried at 60° in vacuo. 2.8 g of the dyestuff of the formula

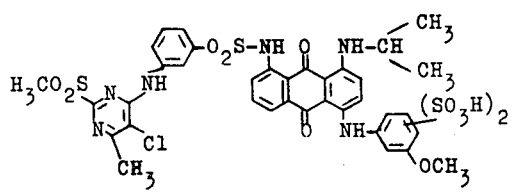

which dyes cotton in green-blue shades, are obtained.

EXAMPLE 37

A solution of 2.3 g of 1-($\beta$-sulphatoethylamino)-4-(p-amino-anilino)5-amino-anthraquinone-monosulphonic acid in 50 ml of $H_2O$ are added dropwise over the course of 30 minutes, at 0°–5°, to a suspension of cyanuric chloride which has been manufactured by dropwise addition of a solution of 2.1 g of cyanuric chloride in 10 ml of acetone to 50 ml of ice water. The pH value of the reaction mixture is kept at 4–5 by means of 1 N sodium carbonate solution. When no further starting material is present (approx. 2 hours) insoluble material is filtered off and the dyestuff solution is buffered by adding a solution of 1.7 g of primary sodium phosphate ($NaH_2PO_4 \cdot 2 H_2O$) and 0.8 g of secondary sodium phosphate in 10 ml of water. Thereafter the product is salted out with 10 g of sodium chloride, filtered off, washed with 1.3% strength sodium chloride solution and dried in vacuo at 60°. 2.6 g of a dyestuff are obtained, which is not entirely a single substance but of which by far the major proportion corresponds, in the acid form, to the formula

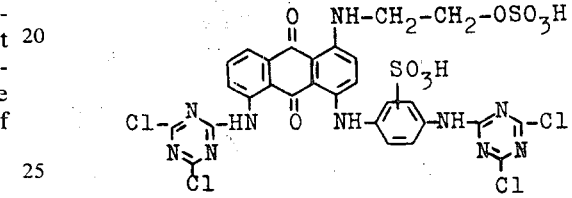

and which dyes polyamide fibres in blue-green shades.

Following the procedures described in Example 25–37 and using appropriate starting compounds, the dyestuffs listed in Table V, of the formula

were obtained, which dye cotton and polyamide in the indicated colour shades.

Table V

| Serial No. | R | $R_1$ | $R_2$ | $R_3$ | Colour shade |
|---|---|---|---|---|---|
| 1 | —CH(CH₃)₂ | phenyl with SO₃H, OCH₃ | Cl, F (pyrimidine) | H | bluish-tinged green |
| 2 | —CH(CH₃)(CH₂—CH₃) | phenyl with (SO₃H)₂, OCH₃ | '' | H | blue-green |
| 3 | —CH(CH₂—CH₃)₂ | phenyl with (SO₃H)₂, O—C₂H₅ | H | Cl, F (pyrimidine) | blue-green |
| 4 | phenyl | phenyl with CH₃, (SO₃H)₂ | H | '' | greenish-tinged blue |
| 5 | —CH(CH₂—OSO₃H)(CH₂—CH₃) | phenyl with SO₃H, —C(CH₃)₃ | H | '' | blue-green |

Table V-continued

| Serial No. | R | $R_1$ | $R_2$ | $R_3$ | Colour shade |
|---|---|---|---|---|---|

Structure:

$$\begin{array}{c} R_2 \quad O \quad NH-R \\ \text{(anthraquinone)} \\ R_3 \quad O \quad NH-R_1 \end{array}$$

| Serial No. | R | $R_1$ | $R_2$ | $R_3$ | Colour shade |
|---|---|---|---|---|---|
| 6 | $-CH(CH_3)_2$ | -Ph(CH_3)(SO_3H) | H | 4,5-dichloro-2-fluoro... (Cl, F, NH-pyrimidine-F) | strongly bluish-tinged green |
| 7 | $-CH(CH_3)_2$ | -Ph(CH_3)(SO_3H)_2 | H | '' | blue-green |
| 8 | -cyclohexyl | -Ph(NH-COCH_3)(SO_3H)_2 | H | '' | blue-green |
| 9 | -C_6H_4-OSO_3H | -Ph-NH-CO-CH_3 (SO_3H) | H | '' | bluish-tinged green |
| 10 | $-CH(CH_3)_2$ | -Ph-N(CO-CH_3)(CH_3)(SO_3H) | H | '' | greenish-tinged blue |
| 11 | -CH(CH_3)-cyclohexyl | -Ph-O-CH_2-CH_2-OSO_3H (SO_3H) | H | '' | blue-green |
| 12 | $-CH_2-CH_2-OSO_3H$ | -Ph-cyclohexyl (SO_3H) | Cl, F, NH-pyrimidine-F | H | blue-green |
| 13 | $-CH_3$ | -Ph(CH_3)(SO_3H)_2 | '' | H | greenish-tinged blue |
| 14 | $-CH_3$ | -Ph(O-C_2H_5)(SO_3H)_2 | '' | H | greenish-tinged blue |
| 15 | $-CH_2-CH_2-C_6H_4-SO_3H$ | -Ph-CH_3 (SO_3H) | '' | H | blue-green |
| 16 | $-CH(CH_3)-CH_2-CH_2-C_6H_4-SO_3H$ | -Ph-OH (SO_3H) | H | Cl, F, NH-pyrimidine-F | blue-green |
| 17 | '' | -Ph-O-SO_3H | H | '' | blue-green |
| 18 | $-CH(CH_3)-CH_2-C(CH_3)_2-C_6H_4-SO_3H$ | -Ph-NH-CO-CH_3 (SO_3H) | H | '' | blue-green |

Table V-continued

| Serial No. | R | $R_1$ | $R_2$ | $R_3$ | Colour shade |
|---|---|---|---|---|---|
| 19 | -CH(CH₂-CH₂-C₆H₄-SO₃H)(CH₂-CH(CH₃)₂) | -C₆H₃(SO₃H)₂(OCH₃) | 5-chloro-2,6-difluoropyrimidin-4-ylamino | H | blue-green |
| 20 | -C₆H₄(SO₃H)-CH(CH₃)₂ | -C₆H₄-O-CH₂-CH₂-OSO₃H | '' | H | blue-green |
| 21 | -C₆H₃(OCH₃)-SO₂-CH₂-CH₂-OSO₃H | -C₆H₄-SO₃H | '' | H | bluish-tinged green |
| 22 | -C₆H₄-CN | -C₆H₃(SO₃H)₂(CH₃) | '' | H | bluish-tinged green |
| 23 | -C₆H₄-COOH | -C₆H₃(SO₃H)₂(OCH₃) | '' | H | bluish-tinged green |
| 24 | -CH(CH₃)₂ | '' | H | 5-chloro-2-fluoropyrimidin-4-ylamino | blue-green |
| 25 | -C₆H₁₁ (cyclohexyl) | -C₆H₃(NH-CO-CH₃)(SO₃H)₂ | 5-chloro-2-fluoropyrimidin-4-ylamino | H | blue-green |
| 26 | -CH(CH₃)₂ | -C₆H₃(O-CH₂-CH₂-OSO₃H)(SO₃H) | -NH-CO-(2,6-dichloropyrimidin-4-yl) | H | blue-green |
| 27 | -CH₃ | -C₆H₃(SO₃H)(O-CH₂-CH₂-OSO₃H) | -NH-CO-(1,4-dichlorophthalazin-6-yl) | H | blue-green |
| 28 | -CH₃ | -C₆H₃(NH-CO-CH₂-OSO₃H)(SO₃H) | -NH-(4-chloro-6-phenoxy-1,3,5-triazin-2-yl) | H | greenish-tinged blue |
| 29 | -C₆H₁₀-OSO₃H | -C₆H₃(CH₃)(SO₃H) | -NH-(4-chloro-6-(1-ethylthio)-1,3,5-triazin-2-yl) | H | greenish-tinged blue |

Table V-continued

| Serial No. | R | R₁ | R₂ | R₃ | Colour shade |
|---|---|---|---|---|---|
| 30 | —CH₂—CH₂—OSO₃H | phenyl with —NH—CO—CH₃ and SO₃H | —NH—(triazine with Cl)—S—(phenyl-Cl) | H | greenish-tinged blue |
| 31 | —CH₃ | phenyl with —N(CH₃)—CO—CH₃ and SO₃H | H | —NH—(triazine-Cl) | greenish-tinged blue |
| 32 | —CH₂—CH₂—(phenyl-SO₃H) | phenyl-SO₃H | H | —NH—(triazine-Cl) | greenish-tinged blue |
| 33 | " | phenyl with CH₃ and SO₃H | H | —NH—(triazine with Cl and —N(C₂H₅)₂) | greenish-tinged blue |
| 34 | —(phenyl-SO₃H)—C(CH₃)₃ | —(phenyl-SO₃H)—OCH₂—CH₂—OSO₃H | H | —NH—(triazine-Cl)—(phenyl) | greenish-tinged blue |
| 35 | —CH(CH₃)₂ | phenyl with CH₃ and (SO₃H)₂ | —NH—(triazine-Cl)—NH—(phenyl-SO₃H) | H | greenish-tinged blue |
| 36 | —(cyclohexyl) | phenyl with —O—CH₂—CH(OH)—CH₂—OH and SO₃H | —NH—(triazine-Cl)—N(CH₃)—(phenyl-SO₃H) | H | greenish-tinged blue |
| 37 | —CH(CH₃)₂ | phenyl with O—CH₂—CH₂—OSO₃H and SO₃H | NH—CO—(quinoxaline-2,3-diCl) | H | blue-green |
| 38 | —CH(CH₂—OSO₃H)(CH₂—CH₃) | phenyl with CH₃ and (SO₃H)₂ | " | H | blue-green |
| 39 | —(cyclohexyl) | " | NH—SO₂—(quinoxaline-2,3-diCl) | H | blue-green |
| 40 | —CH₃ | phenyl with NH—CO—CH₂—OSO₃H and (SO₃H)₂ | NH—CO—(quinoxaline-2,3-diCl) | H | blue-green |
| 41 | —(cyclohexyl)—OH | phenyl with CH₃ and (SO₃H)₂ | NH—CO—C(Br)=CH₂ | H | greenish-tinged blue |
| 42 | —CH(CH₃)₂ | phenyl with Br and (SO₃H)₂ | NH—CO—C(Br)=CH₂ | H | blue |

Table V-continued

| Serial No. | R | R₁ | R₂ | R₃ | Colour shade |
|---|---|---|---|---|---|
| 43 | —CH₂—CH₂—OSO₃H | 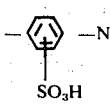—NH—CO—CH₃ (with SO₃H) | NH—CO—CH—CH₂—Br (with Br) | H | greenish-tinged blue |
| 44 | —CH₂—CH₂—OSO₃H | 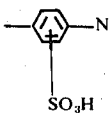—NH—(triazine)—Cl (with SO₃H, Cl) | H | NO₂ | greenish-tinged blue |
| 45 | —CH₂—CH₂—(phenyl-SO₃H) | 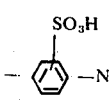 SO₃H; —NH—(triazine with Cl, F) | —NH—CO—CH₂—Cl | H | greenish-tinged blue |
| 46 | —CH₂—CH₂—OSO₃H | 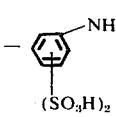—NH—(triazine)—Cl (with (SO₃H)₂, Cl) | H | —NH—(pyrimidine) / Cl | greenish-tinged blue |
| 47 | —(phenyl)—CH₃ (with SO₃H) | 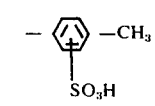—NH—(triazine with Cl, F, CH₃) (with (SO₃H)₂, F) | —NH—CO—CH—CH₂—Br (with Br) | H | blue-green |
| 48 | —CH(CH₂—OSO₃H)(CH₂—CH₃) | —CH₂—CH₂—(phenyl-SO₃H) | H | —NH—(triazine with Cl, F) | blue |
| 49 | —CH₂—CH₂—OSO₃H | —CH—CH₂—CH₂—(phenyl-SO₃H) (with CH₃) | H | '' | blue |
| 50 | —(cyclohexyl)—OSO₃H | —CH₂—CH₂—OSO₃H | H | '' | blue |

EXAMPLE 38

The compounds employed in Examples 1–37, the manufacture of which has not been described, can be obtained, inter alia, as follows:

a. 1-Isopropylamino-4-bromo-5-nitro-anthraquinone 300 g of 1-isopropylamino-5-nitro-anthraquinone (85% strength) are dissolved in 600 ml of nitrobenzene at 120°, the mixture is cooled with vigourous stirring and 186 g of bromine = 120% of theory are added dropwise at 10° → 20° over the course of 10 minutes, the whole is further stirred overnight until cold, diluted with 600 ml of ethanol and stirred for a further 3 hours, and the product is filtered off, washed with 250 ml of a mixture of equal parts of nitrobenzene and ethanol and finally with ethanol until free of nitrobenzene, and dried. 222 g of 1-isopropylamino-4-bromo-5-nitro-anthraquinone are obtained. Quality: 95% pure.

The procedure described under a is followed. If dilution is carried out with 1600 ml of ethanol instead of 600 ml, 268 g of 1-isopropylamino-4-bromo-5-nitro-anthraquinone are obtained. Quality: 92% pure.

1-Isopropylamino-5-nitro-anthraquinone is obtained from 1,5-dinitro-anthraquinone by reaction with isopropylamine in inert solvents at elevated temperature.

b. 1-Isopropylamino-4-chloro-5-nitro-anthraquinone 10 g of 1-isopropylamino-5-nitro-anthraquinone (85% strength) are dissolved in 40 ml of nitrobenzene at 60°–70°, 5.2 g of sulphuryl chloride are then added dropwise at room temperature over the course of 30 minutes and the mixture is stirred for a further hour at room temperature. It is diluted with 80 ml of methanol and further stirred for one hour in an ice bath and the product is filtered off and washed with methanol and water. Yield: 6.9 g.

c. 1-p-Toluidino-4-chloro-5-nitro-anthraquinone 10 g of 1-nitro-5,8-dichloro-anthraquinone are warmed with 30 g of toluidine, 4 g of potassium acetate and 100 mg of copper' chloride, activated with iodine, initially at 85°–90° and towards the end at 95°–100° until only a little starting material remains detectable. The mixture is diluted with 60 ml of glacial acetic acid and the product is filtered off at room temperature and washed with glacial acetic acid and water. 4.9 g of a single product which probably has the structure 1-p-toluidino-5-nitro-4-chloro-anthraquinone are obtained.

The filtrate contains the isomeric compound, which probably has the structure of a 1-p-toluidino-8-nitro-4-chloro-anthraquinone. It is precipitated by adding water.

d. The following compounds, inter alia, are obtained in a similar manner to that described in a – c from the corresponding 1-(alkyl-, cycloalkyl-, aralkyl- or aryl-)-amino-5(8)nitro-anthraquinones by halogenation: 1-β-hydroxyethylamino-4-bromo-5-nitro-anthraquinone, 1-β-hydroxyethylamino-4-bromo-8-nitro-anthraquinone, 1-methylamino-4-bromo-5-nitro-anthraquinone, 1-methylamino-4-bromo-8-nitro-anthraquinone, 1-cyclohexylamino-4-bromo-5-nitro-anthraquinone, 1-cyclohexylamino-4-bromo-8-nitro-anthraquinone, 1-isobutylamino-(2)-4-bromo-5-nitro-anthraquinone, 1-isobutylamino-(2)-4-bromo-8-nitro-anthraquinone as well as the corresponding compounds in which the bromine is replaced by chlorine, and also 1-isopropylamino-4-chloro-8-nitro-anthraquinone, 1-β-phenylethylamino-4-chloro-5-nitro-anthraquinone, 1-β-phenylethylamino-4-chloro-8-nitro-anthraquinone, 1-m-toluidino-4-chloro-5-nitro-anthraquinone and 1-p-anisidino-4-chloro-8-nitro-anthraquinone.

EXAMPLE 39 a. 1-Isopropylamino-4-bromo-5-amino-anthraquinone 124 g of 1-isopropylamino-4-bromo-5-nitro-anthraquinone, obtained according to Example 38 a), in 1,240 ml of glacial acetic acid are treated at 80°–85°, over the course of 30 minutes, with 65 g of iron powder and the mixture is further stirred for a total of 1½ hours at 80°–85°. chromatographically, only traces of the starting material remain detectable. The mixture is stirred until cold and filtered, and the filter residue is washed with 250 ml of glacial acetic acid. The filter residue is stirred with dilute hydrochloric acid until all the iron has dissolved, the mixture is filtered and the residue is washed until neutral and dried. 101 parts of 1-isopropylamino-4-bromo-5-amino-anthraquinone are obtained. Quality: 94% pure (containing 1% of 1-isopropylamino-4-bromo-5-nitro-anthraquinone and 3% of 1-isopropylamino-5-amino-anthraquinone).

The product thus obtained can be freed of 1-isopropylamino-5-amino-anthraquinone as follows:

10 g are dissolved in 50 ml of 60% strength sulphuric acid at 50°, the mixture is diluted with water at the same temperature to 40% strength sulphuric acid and is stirred overnight until cold and the needles which have separated out are filtered off, washed with a little 35% strength sulphuric acid, washed with water until neutral and dried. Yield: 8.4 g. Quality: 97.3% pure.

b. 1-β-Phenylethylamino-4-chloro-5(8)-amino-anthraquinone 100 g of 1,4-dichloro-5-amino-anthraquinone, 42 g of potassium acetate and 300 ml of β-phenylethylamine are warmed to 100°–105° for 3 hours. From 70° onwards the mixture is diluted with 300 ml of ethylene glycol ether and is then stirred until cold, and the product is filtered off and washed with a little ethylene glycol ether and water. 89 g of an isomer mixture of 1-β-phenylethylamino-4-chloro-5- and -8-amino-anthraquinone are obtained after drying.

c. Starting from 1,4-dibromo-5-amino-anthraquinone, the corresponding compounds carrying bromine in the 4-position are obtained in the same manner.

d. 1-p-Toluidino-4-chloro-5-amino-anthraquinone 40 g of 1-p-toluidino-4-chloro-5-nitro-anthraquinone in 400 ml of glacial acetic acid are treated, at 80°–85°, with the requisite amount of iron powder (approx. 20 g are needed) and the mixture is kept at the same temperature until starting material is no longer detectable. The mixture is stirred until cold and the product is filtered off and rinsed with a little glacial acetic acid. Remnants of iron are dissolved from the residue by digestion in dilute hydrochloric acid and the product is filtered off, washed until neutral and dried. 27.8 g are obtained.

e. The following compounds, inter alia, are obtained in accordance with the methods described in a – d: 1-isopropylamino-4-bromo-8-amino-anthraquinone, 1-isopropylamino-4-chloro-8-amino-anthraquinone, 1-isopropylamino-4-chloro-5-amino-anthraquinone, 1-β-hydroxyethylamino-4-bromo-5-(or -8)-amino-anthraquinone, 1-methylamino-4-bromo-5-(or -8)-amino-anthraquinone, 1-methylamino-4-chloro-5-(or -8)-amino-anthraquinone, 1-cyclohexylamino-4-bromo-5-(or -8)-amino-anthraquinone, 1-cyclohexylamino-4-chloro-5-(or -8)-amino-anthraquinone, 1-β-phenylethylamino-4-bromo-5-(or -8)-amino-anthraquinone, 1-p-toluidino-4-bromo-5-(or -8)-amino-anthraquinone and 1-p-toluidino-4-chloro-8-amino-anthraquinone.

EXAMPLE 40 a. 1-Isopropylamino-4-bromo-5-acetylamino-anthraquinone 20 g of 1-isopropylamino-4-bromo-5-amino-anthraquinone are treated with 60 ml of acetic anhydride at 105°–110° until (approx. 20 minutes being necessary) starting material is no longer detectable in a chromatographed sample. The mixture is diluted with 60 ml of acetic acid and the product is filtered off cold, washed with a little acetic acid and finally with hot water until neutral, and dried. 20.6 g of 1-isopropylamino-4-bromo-5-acetylamino-anthraquinone are obtained.

b. 1-Methylamino-4-bromo-5-cyclohexylcarbonylamino-anthraquinone 20 g of 1-methylamino-4-bromo-5-amino-anthraquinone are introduced into 80 ml of pyridine and 10.7 g of cyclohexanecarboxylic acid chloride are added over the course of 15 minutes whilst stirring; in the course thereof, the temperature noticeably rises. The reaction is complete after a short time. The product is filtered off at room temperature and washed with 20 ml of pyridine and with a copious amount of water. 24.1 g of 1-methylamino-4-bromo-5-cyclohexylcarbonylamino-anthraquinone are obtained.

c. 1-p-Toluidino-4-chloro-5-phenylaminocarbonylamino-anthraquinone 20 g of 1-p-toluidino-4-chloro-5-amino-anthraquinone are dissolved in 200 ml of dry pyridine and 20 ml of benzene, 11 ml of phenylisocyanate are added at 80°–85° and the mixture is stirred for a further 2 hours at the same temperature. It is stirred overnight until cold and the needle-shaped precipitate is filtered off and washed with pyridine and water. 18 g of 1-p-toluidino-4-chloro-5-phenylaminocarbonylamino-anthraquinone are obtained.

d. If in c instead of phenylisocyanate, a stoichiometrically equal amount of phenylisothiocyanate is employed, 1-p-toluidino-4-chloro-5-phenylamino-thiocarbonylamino-anthraquinone is obtained.

e. 1-Isopropylamino-4-bromo-5-(methoxy-carbonylamino)-anthraquinone 20 g of 1-isopropylamino-4-bromo-5-aminoanthraquinone are dissolved in 100 ml of N-methylpyrrolidone, a total of 28 g of chloroformic acid methyl ester is added at room temperature and the mixture is heated to 100°–120° over the course of 1 hour and kept thereat for 2 hours. It is stirred until cold and the crystalline material which has separated out is filtered off, washed with 30 ml of N-methylpyrrolidone and with water and dried in vacuo. 13.3 g of pure compound are obtained.

f. 1-Isopropylamino-4-bromo-5-p-toluenesulphonylamino-anthraquinone 20 g of 1-isopropylamino-4-bromo-5-aminoanthraquinone - obtained according to Example 39 a) - are dissolved in 80 ml of pyridine, 13.2 g of p-toluenesulphonyl chloride are added and the mixture is further stirred for 45 minutes at 80°–85°. It is diluted with 80 ml of methanol in the cold and stirred for a further 10 hours in the cold, and the precipitate is filtered off, successively washed with 40 ml of a mixture of equal parts of pyridine and methanol, and with methanol and water, and dried in vacuo. 24.1 g of the pure compound are obtained.

g. The following compounds, inter alia, can be manufactured in accordance with one of the procedures described in a – f: 1-isopropylamino-4-bromo-8-acetylamino-anthraquinone, 1-isopropylamino-4-chloro-5-acetylamino-anthraquinone, 1-isopropylamino-4-bromo-5-(or -8)-(phenylamino-carbonyl-amino)-anthraquinone, 1-isobutylamino-4-bromo-5-(or -8)-(phenylamino-carbonyl-amino)anthraquinone, 1-isopropylamino-4-chloro-5-(or -8)-(methoxycarbonylamino)-anthraquinone, 1-cyclohexylamino-4-bromo-5-(or -8)-acetylamino-anthraquinone, 1-cyclohexylamino-4-bromo-5-(or -8)-benzoylamino-anthraquinone, 1-hydroxyethylamino-4-bromo-5-(or -8)-(phenoxy-carbonylamino)-anthraquinone, 1-hydroxyethylamino-4-chloro-5-(or -8)-cyclohexylcarbonylamino-anthraquinone, 1-methylamino-4-bromo-5-(or -8)-acetylamino-anthraquinone, 1-methylamino-4-bromo-5-(or -8)-ethylamino-carbonylamino)-anthraquinone, 1-isopropylamino-4-bromo-5-(or -8)-(phenylamino-thiocarbonylamino)-anthraquinone, 1-cyclohexylamino-4-bromo-5-(or -8)-(ethylamino-thiocarbonylamino)-anthraquinone, 1-β-phenylethylamino-4-bromo-5-(or -8)-acetylamino-anthraquinone, 1-γ-phenyl-α-methyl-propylamino-4-chloro-5-(or -8)-(ethoxy-carbonylamino)-anthraquinone, 1-p-toluidino-4-chloro-5-(or -8)-acetylamino-anthraquinone, 1-p-anisidino-4-bromo-5-(or -8)-(methoxycarbonylamino)-anthraquinone, 1-methylamino-4-bromo-5-(or -8)-p-toluenesulphonylamino-anthraquinone, 1-cyclohexylamino-4-bromo-5-(or -8)-methylsulphonylamino-anthraquinone and 1-β-phenylethylamino-4-chloro-5-(or -8)-p-toluenesulphonylamino-anthraquinone.

EXAMPLE 41 a. 1.5 g of 1-(β-sulphatoethylamino)-4-[4'-(2-methylsulphonyl-5-chloro-6-methyl-pyrimidyl-amino)-anilino]-5-amino-anthraquinone-monosulphonic acid are dissolved in 48 ml of water at 55°C. After adding 1.5 g of 2,3-dichloroquinoxaline-6-carboxylic acid chloride and 0.5 ml of chlorobenzene, the pH value of the reaction mixture is kept at 5.5–6.5 by dropwise addition of 1 N sodium hydroxide solution and the mixture is further stirred at the same pH value and 50°–60°C until starting material is no longer detectable chromatographically. After the customary working up, 1.7 g of the dyestuff, which in the acid form corresponds to the formula

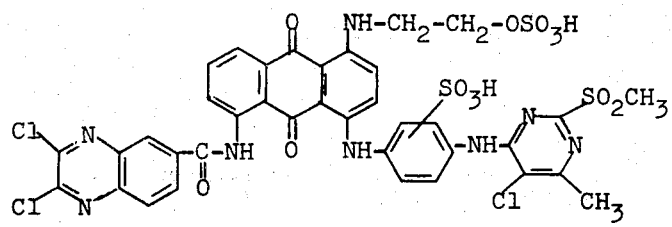

and dyes polyamide fibres in bluish-tinged green shades, are obtained.

b. The starting material employed under a is obtained by reaction of 2.2 g of 1-(β-sulphatoethylamino)-4-(4'-aminoanilino)-5-amino-anthraquinone-monosulphonic acid with 2-methylsulphonyl-4,5-dichloro-6-methyl-pyrimidine.

c. If in a, instead of dichloroquinoxalinecarboxylic acid chloride, α,β-dibromopropionic acid chloride is employed, the dyestuff of the formula

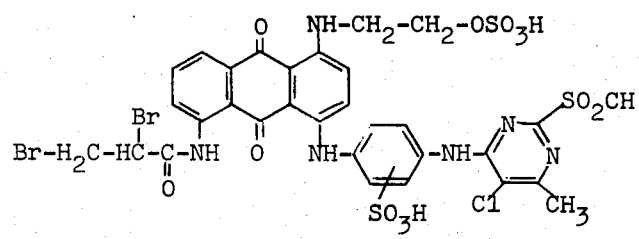

which dyes polyamide fibres in blue-green shades, is obtained.

EXAMPLE 42

1. Reactive dyeing of cotton yarn from a dilute liquor. 10 g of cotton yarn are introduced into a dyebath at 30°C, which contains 0.3 g of the dyestuff of Example 26 dissolved in 200 ml of water. The bath is warmed to 50°C over the course of 15 minutes, 10 g of anhydrous sodium sulphate are added followed, after a further 30 minutes, by 4 g of sodium carbonate, and the bath is kept at 50°C for a further 50 minutes. The dyed material is first rinsed cold and then hot and is soaped at the boil with a solution of 0.2 g of sodium alkylsulphonate in 200 ml of water, again rinsed and dried. A clear bluish-tinged green dyeing with good fastness properties is obtained.

2. Reactive dyeing of cotton by the pad-steam process. 3 g of the dyestuff of Example 28 are dissolved in 50 ml of water and 15 g of urea and after adding 15 g of a 15% strength sodium carbonate solution the mixture is made up to 100 ml. 20 g of cotton fabric are padded with this solution so that the liquor uptake is about 80%. After an intermediate drying the fabric is steam-treated for 8 minutes at 102°–103°C or subjected to a heat treatment at 150°C for 4 minutes. Thereafter it is washed, soaped at the boil, again washed and dried. A blue-green dyeing is obtained.

I claim:

1. Anthraquinone dyestuff which, in the free acid form, has the formula

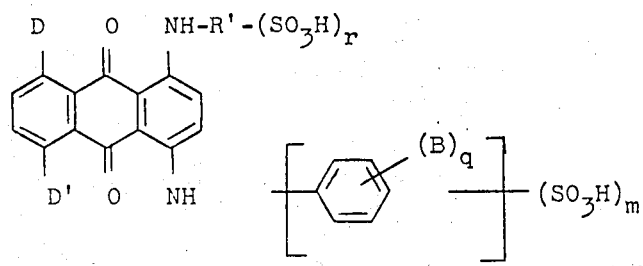

wherein
R' is $C_1$-$C_{12}$-alkyl; $C_1$$C_{12}$-alkyl substituted by cyano, hydroxy, nitro, halogen, $C_1$-$C_4$-alkoxy, $C_1$-$C_4$-alkoxy carbonyl, $C_1$-$C_4$-alkoxycarbonyloxy, $C_1$-$C_4$-alkylcarbonyloxy, $C_1$-$C_4$-alkylcarbonylamino, $C_1$-$C_4$-alkylsulfonyl, $C_1$-$C_4$-alkylaminocarbonyloxy, $C_1$-$C_4$-alkylaminocarbonylamino, $C_1$-$C_4$-alkylaminothiocarbonylamino, $C_1$-$C_4$-alkylaminosulfonyloxy, phenoxy, amino, mono-$C_1$-$C_4$-alkylamino, di-$C_1$-$C_4$-alkylamino, benzoyloxy or $C_1$-$C_4$-alkylmercapto; phenyl-$C_1$-$C_8$-alkyl; cyclohexyl; or cyclohexyl substituted by $C_1$-$C_8$-alkyl, benzyl, phenoxy, $C_1$-$C_4$-alkoxy, amino or $C_1$-$C_4$-alkyl amino;

D and D' are nitro or hydrogen, but cannot simultaneously have the same meaning;

B is $C_1$-$C_4$-alkyl; $C_1$-$C_4$-alkoxy; $C_1$-$C_4$-alkylmercapto; $C_1$-$C_4$-alkylsulfonyl; fluoro; chloro; bromo; amino; phenylsulfonyl; phenylmercapto; phenoxy; phenyl-$C_1$-$C_4$-alkylaminosulfonyl; phthalimido-N-methyl; or caprolactam-N-methyl;

$q$ is a number from 0 to 4; and $r$ and $m$ are numbers from 0 to 3 and $(r+m) = 1$ to 4.

* * * * *